(12) United States Patent
Ishii et al.

(10) Patent No.: US 9,684,855 B2
(45) Date of Patent: Jun. 20, 2017

(54) PRINTER

(71) Applicant: Brother Kogyo Kabushiki Kaisha, Nagoya-shi, Aichi (JP)

(72) Inventors: Hidekazu Ishii, Inazawa (JP); Takahiro Miwa, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/061,049

(22) Filed: Mar. 4, 2016

(65) Prior Publication Data

US 2016/0371571 A1    Dec. 22, 2016

(30) Foreign Application Priority Data

Jun. 18, 2015    (JP) ................................. 2015-122990

(51) Int. Cl.
    *G06K 15/02*       (2006.01)
    *B41J 3/407*       (2006.01)

(52) U.S. Cl.
    CPC .......... *G06K 15/022* (2013.01); *B41J 3/4075* (2013.01); *G06K 15/1827* (2013.01)

(58) Field of Classification Search
    CPC ..................................................... B41J 3/4075
    See application file for complete search history.

(56) References Cited

U.S. PATENT DOCUMENTS

| 5,503,482 | A | * | 4/1996 | Kawakami | B41J 3/4075 400/615.2 |
|---|---|---|---|---|---|
| 5,808,624 | A | * | 9/1998 | Ikedo | G06T 11/00 345/630 |
| 5,831,590 | A | | 11/1998 | Ikedo | |
| 6,496,275 | B1 | * | 12/2002 | Kurashina | B41J 3/4075 358/1.11 |
| 6,901,172 | B1 | * | 5/2005 | Shirakawa | G06T 11/00 345/630 |
| 2001/0010521 | A1 | * | 8/2001 | Hayama | B41J 3/4075 345/619 |

(Continued)

FOREIGN PATENT DOCUMENTS

| JP | H10-011597 A | 1/1998 |
|---|---|---|
| JP | 2013-043300 A | 3/2013 |

*Primary Examiner* — Stephen Meier
*Assistant Examiner* — John P Zimmermann
(74) *Attorney, Agent, or Firm* — Banner & Witcoff, Ltd.

(57) ABSTRACT

The disclosure discloses a printer including a first memory and a controller. The first memory is configured to store a plurality of types of partial print data for print formation of a plurality of types of partial pictorial symbols wherein some of the partial pictorial symbols are combined into at least one pictorial symbol. The controller is configured to execute a determining operation acceptance process, a print data generation process, and a coordination control process. In the determining operation acceptance process, a determining operation for determining the pictorial symbol is accepted. In the print data generation process, print data including the pictorial symbol determined by variably combining the plurality of types of the partial print data stored in the first memory is generated. In the coordination control process, the feeder and the printing head are coordinately controlled for forming a print corresponding to the print data on the print-receiving medium.

16 Claims, 12 Drawing Sheets

(56) References Cited

U.S. PATENT DOCUMENTS

2003/0219300 A1* 11/2003 Kurashina .............. B41J 11/008
   400/615.2
2005/0058485 A1* 3/2005 Horii ...................... B41J 3/4075
   400/76
2008/0165370 A1* 7/2008 Takayama .............. B41J 3/4075
   358/1.2

* cited by examiner

FIG. 6

| CHARACTER CODE | PRINT DOT PATTERN DATA |
|---|---|
| 0001 | A |
| ⋮ | ⋮ |
| 1001 | LP1 |
| ⋮ | ⋮ |
| 2001 | RP1 |
| ⋮ | ⋮ |

FIG. 7

| CHARACTER CODE (1) | CHARACTER CODE (2) |
|---|---|
| ⋮ | ⋮ |
| 1001,2001 | 3001 |
| 1011,2011 | 3002 |
| ⋮ | ⋮ |

FIG. 8

| | | 2001 | 2002 | 2003 | 2004 | 2005 | ... | 2011 | 2012 | ... |
|---|---|---|---|---|---|---|---|---|---|---|
| RIGHT/UPPER PART SYMBOL OBJECT | 1001 | ○ | ○ | ○ | ○ | ○ | | × | × | |
| | 1002 | ○ | ○ | ○ | ○ | ○ | | × | × | |
| | 1003 | ○ | ○ | ○ | ○ | ○ | | × | × | |
| | ... | | | | | | | | | |
| | 1011 | × | × | × | × | × | | ○ | ○ | |
| | 1012 | × | × | × | × | × | | ○ | ○ | |
| | 1013 | × | × | × | × | × | | ○ | ○ | |
| | ... | | | | | | | | | |

LEFT/LOWER PART SYMBOL OBJECT

PRINTER

CROSS-REFERENCE TO RELATED APPLICATION

The present application claims priority from Japanese Patent Application No. 2015-122990, which was filed on Jun. 18, 2015, the disclosure of which is incorporated herein by reference in its entirety.

BACKGROUND

Field

The present disclosure relates to a printer performing a print on a print-receiving medium.

Description of the Related Art

A printer performing a print on a print-receiving medium has hitherto been known.

This printer (tape printer) stores a plurality of types of print pictorial symbol data (printing dot pattern data), to print print data (printing data) on the print-receiving medium (a printing tape) by use of the print data.

In the above prior art, a plurality of types of print data are prepared for each of the pictorial symbols. Accordingly, in the case of preparing print data of a plurality of pictorial symbols each having partially a common pattern design but generally a different pattern design, the data amount of print data to be prepared disadvantageously increases.

SUMMARY

It is therefore an object of the present disclosure to provide a printer capable of reducing the data amount of print data to be prepared.

In order to achieve the above-described object, according to the aspect of the present application, there is provided a printer comprising a feeder configured to feed a print-receiving medium, a printing head configured to form a print on the print-receiving medium fed by the feeder, an operation device configured to input a desired operation, a first memory configured to store a plurality of types of partial print data prepared in advance for print formation of a plurality of types of pictorial symbols wherein some of the partial pictorial symbols are combined into at least one pictorial symbol that is to be printed on the print-receiving medium, and a controller, the controller being configured to execute a determining operation acceptance process for accepting a determining operation for determining the pictorial symbol via the operation device, a print data generation process for generating print data including the pictorial symbol determined by variably combining the plurality of types of partial print data stored in the first memory in accordance with the determining operation accepted in the determining operation acceptance process, and a coordination control process for coordinately controlling the feeder and the printing head for forming a print corresponding to the print data on the print-receiving medium.

The printer of the present disclosure can form a print containing an intended pictorial symbol intended by the operator, on a print-receiving medium.

More specifically, the first storage stores a plurality of types of partial print data. Each partial print data is print formation data of a plurality of partial pictorial symbols that are combined into a pictorial symbol. When the operator operates an operation device to determine a pictorial symbol, the determining operation is accepted at a determining operation acceptance process. Subsequently, in accordance with the accepted determining operation, a plurality of the partial print data stored in the first memory are variably combined at the print data generation process, to generate print data containing the determined pictorial symbol. On the basis of the generated print data, a corresponding print is formed on the print-receiving medium, under control at a coordination control process.

As a result of the above, when the operator determines a pictorial symbol, it is possible to generate print data containing the pictorial symbol and therefore form a print containing the pictorial symbol, by combining a plurality of the partial print data of partial pictorial symbols each forming a part of the pictorial symbol, from among the plurality of types of partial print data prepared in advance for each partial pictorial symbol in advance. Thus, in order to prepare print data of a plurality of pictorial symbols each having partially a common pattern design but generally a different pattern design, it is sufficient for a partial pictorial symbol corresponding to the common pattern design portion to have only single partial print data. In consequence, as compared with the case of preparing a plurality of types of print data for each of pictorial symbols, the data amount of print data to be prepared can be reduced. Various and diverse pictorial symbol prints can be implemented by changing combination patterns of the partial print data.

BRIEF DESCRIPTION OF THE DRAWINGS

FIG. 6 is a table showing storage contents of a print CGROM.

FIG. 7 is a table showing storage contents of a basic pictorial symbol information storing part.

FIG. 8 is a table showing matching information stored in a matching information storing part.

DETAILED DESCRIPTION OF THE PREFERRED EMBODIMENTS

An embodiment of the present disclosure will now be described with reference to the drawings.

<Overall Schematic Configuration>

Figure 1:
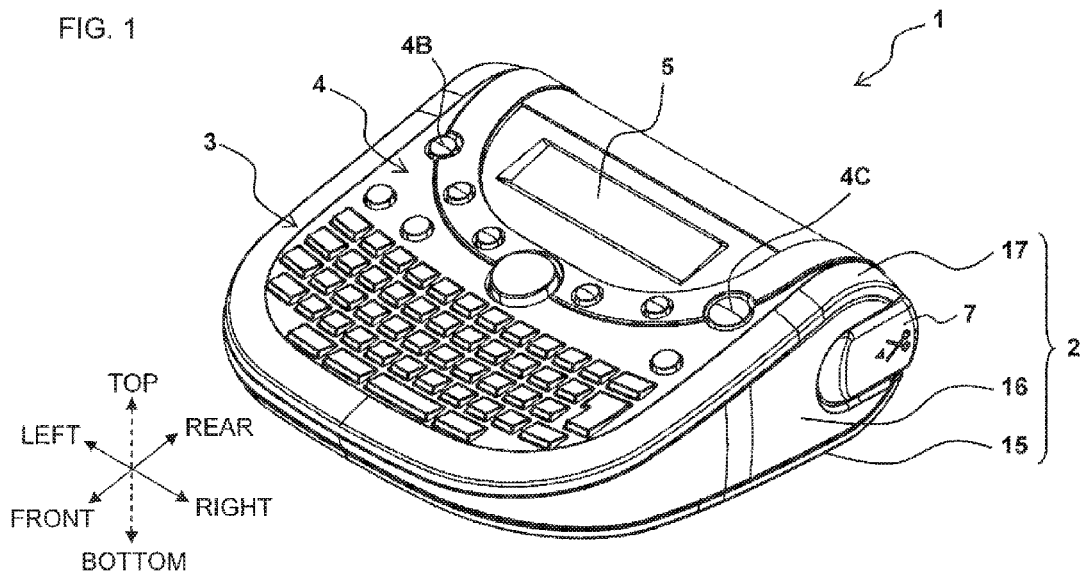
FIG. 1 is an external perspective view of a printer according to an embodiment of the present disclosure, when viewed from diagonally above.
Figure 2:
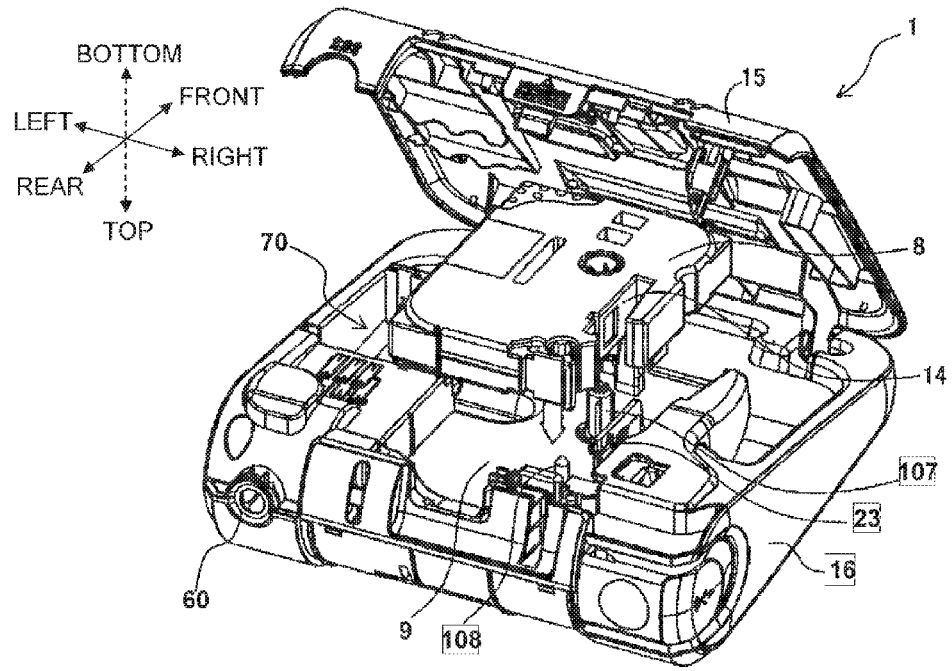
FIG. 2 is an external perspective view of the printer with its bottom cover opened, when viewed from diagonally below.
Figure 3:
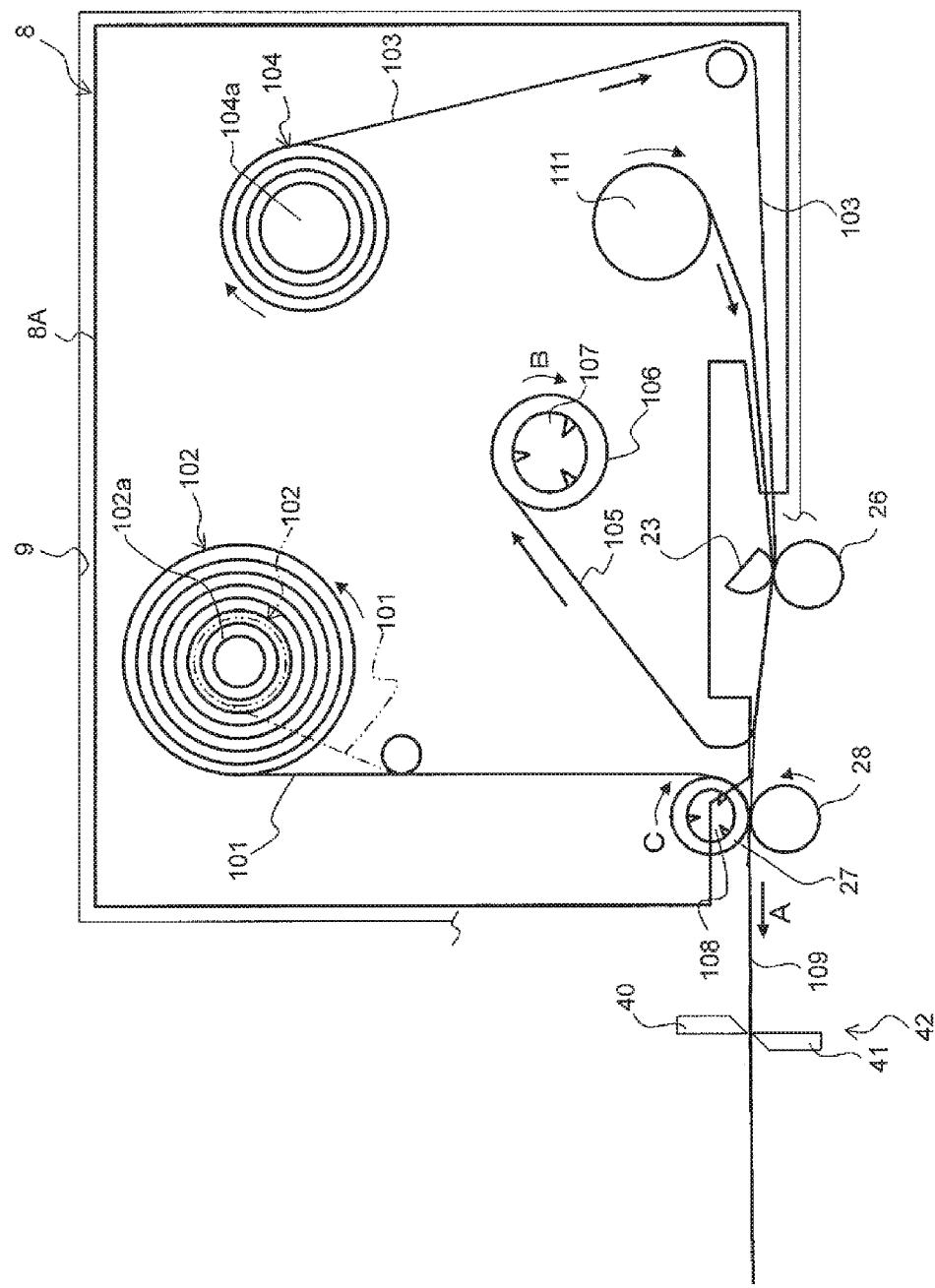
FIG. 3 is an enlarged plan view schematically showing an inner structure of a cartridge.

Referring first to FIGS. 1 to 3, a schematic configuration of a printer of this embodiment will be described.

In FIGS. 1 to 3, a printer 1 cuts a printed label tape 109 having a intended print thereon to a predetermined length, to produce a print label as a print tape (see FIG. 9G described later). In this embodiment, front, rear, left, right, top, and bottom refer to the directions indicated in FIGS. 1 and 2, etc.

As shown in FIGS. 1 and 2, a housing 2 of the printer 2 is made up of a bottom cover 15 forming an apparatus bottom, a side cover 16 forming an apparatus side, and a top cover 17 forming an apparatus top. From front toward rear, the top cover 17 includes a keyboard 3 via which various operations such as character inputs are performed, function keys 4 allowing execution of various functions of the printer 1, and a liquid crystal display 5 for displaying texts corresponding to characters (objects) such as letters, signs, and symbol marks input via the keyboard 3, etc. The keyboard 3 has, for example, ordinary alphabet and numeric keys in addition to four cursor keys "↑", "←", "→", and "↓,". The function keys 4 include, in this example, a power switch 4B and a printing key 4C. To the right rear of the side cover 16, a cutter lever 7 is disposed for cutting the printed label tape 109 (see FIG. 3 described later).

A cartridge holder 9 capable of loading or unloading a cartridge 8 is disposed to the upper rear of the printer 1. This cartridge holder 9 is covered when closing the bottom cover 15 configured to be openable pivotally around a front end of the printer 1, and is exposed when opening the bottom cover 15.

As shown in FIG. 2, to the upper rear of the printer 1, a battery receiving part 70 capable of receiving a plurality of batteries BT (see FIG. 4 described later) is disposed adjacent to the cartridge holder 9. In FIG. 2, reference numeral 60 denotes a DC jack to which an output plug of an AC adapter 220 (see FIG. 4 described later) is connected as an external power source.

<Cartridge>

As shown in FIG. 3, the cartridge 8 has a housing 8A, a first roll 102 (though actually having a spiral shape, it is simply shown as a concentric one in the diagram) into which a strip-like base tape 101 is wound, disposed within the housing 8A, a second roll 104 (though actually having a spiral shape, it is simply shown as a concentric one in the diagram) into which a transparent cover film 103 substantially equal in width to the base tape 101 is wound, disposed within the housing 8A, a ribbon feeding roll 111 feeding out an ink ribbon 105 (not required if the print-receiving medium is a thermosensitive tape) that is a thermal transfer ribbon, a ribbon take-up roller 106 taking up the printed ink ribbon 105, and a tape feed roller 27 rotatably supported in the vicinity of a tape discharge portion of the cartridge 8.

The tape feed roller 27 presses and bond together the base tape 101 and the cover film 103 into a printed-label tape 109, to feed the tape 109 in a direction indicated by an arrow A in FIG. 3.

The first roll 102 is a roll obtained by winding the base tape 101 around a reel member 102a. Although not shown in detail, the base tape 101 is of a four-layer structure in this example and is made up of a pressure-sensitive adhesive layer for bonding, made of an appropriate pressure-sensitive adhesive, a colored base film made of PET (polyethylene terephthalate), etc., a pressure-sensitive adhesive layer for bonding, made of an appropriate pressure-sensitive adhesive, and a separation sheet, which are laminated in the mentioned order from the inner wound side toward the opposite side thereof.

The second roll 104 is a roll obtained by winding the cover film 103 around a reel member 104a. The ink ribbon 105 is pressed and abutted, by a thermal head 23 (see also FIG. 2), against the back surface of the cover film 103 fed out from the second roll 104.

Corresponding to the configuration of the cartridge 8, the cartridge holder 9 is disposed with a ribbon take-up roller drive shaft 107 (see also FIG. 2) taking up the ink ribbon used and with a tape feed roller drive shaft 108 (see also FIG. 2) driving the tape feed roller 27 for transporting the printed label tape 109. In the cartridge holder 9, the thermal head 23 performing intended printing on the cover film 103 is arranged so as to lie in an opening 14 (see FIG. 2) of the cartridge 8 when loading the cartridge 8.

The ribbon take-up roller 106 and the tape feed roller 27 are rotationally driven in conjunction with each other, by driving forces of a drive motor 211 (see FIG. 4 described later) in the form of, e.g., a pulse motor disposed outside of the cartridge 8, transmitted via a gear mechanism not shown to the ribbon take-up roller drive shaft 107 and the tape feed roller drive shaft 108, respectively.

In the above configuration, when the cartridge 8 is loaded in the cartridge holder 9 and a roll holder is moved from its release position (not shown) to a print position shown in FIG. 3, the cover film 103 and the ink ribbon 105 are held between the thermal head 23 and a platen roller 26 arranged facing the thermal head 23. At the same time, the base tape 101 and the cover film 103 are held between the tape feed roller 27 and a pressure roller 28 arranged facing the tape feed roller 27. The drive motor 211 then rotationally drives the ribbon take-up roller 106 and the tape feed roller 27, by its driving forces, in synchronism in directions indicated by arrows B and C, respectively, of FIG. 3. At this time, the tape feed roller drive shaft 108 is coupled via a gear mechanism (not shown) to the pressure roller 28 and the platen roller 26, so that drive of the tape feed roller drive shaft 108 causes rotations of the tape feed roller 27, the pressure roller 28, and the platen roller 26 so that the base tape 101 is fed out from the first roll 102 to be supplied to the tape feed roller 27 as described above.

On the other hand, while the cover film 103 is fed out from the second roll 104, a plurality of heater elements disposed in the thermal head 23 are energized to generate heat by a thermal head control circuit 217 (see FIG. 4 described later). At this time, the ink ribbon 105 driven by the ribbon take-up roller 106 is pressed and abutted, by the thermal head 23, against the back surface side (i.e., the side adhering to the base tape 101) of the cover film 103. As a result, the cover film 103 has on its back surface a print that corresponds to text print data corresponding to characters input via the keyboard 3, etc.

The base tape 101 and the printed cover film 103 having the print thereon are then integrally bonded together, via the pressure-sensitive adhesive layer for bonding, by pressing of the tape feed roller 27 and the pressure roller 28, to be formed as the printed label tape 109 which in turn is discharged to the outside of the cartridge 8. After completion of the print onto the cover film 103, the ink ribbon 105 is taken up by the ribbon take-up roller 106 through the drive of the ribbon take-up roller drive shaft 107.

A cutting mechanism 42 having a fixed blade 40 and a movable blade 41 is disposed downstream of a transport path of the printed label tape 109 discharged to the outside of the cartridge 8. By operating the cutter lever 7, the movable blade 41 is activated to cut the printed label tape 109 into a print label L.

<Control System>

Figure 4:
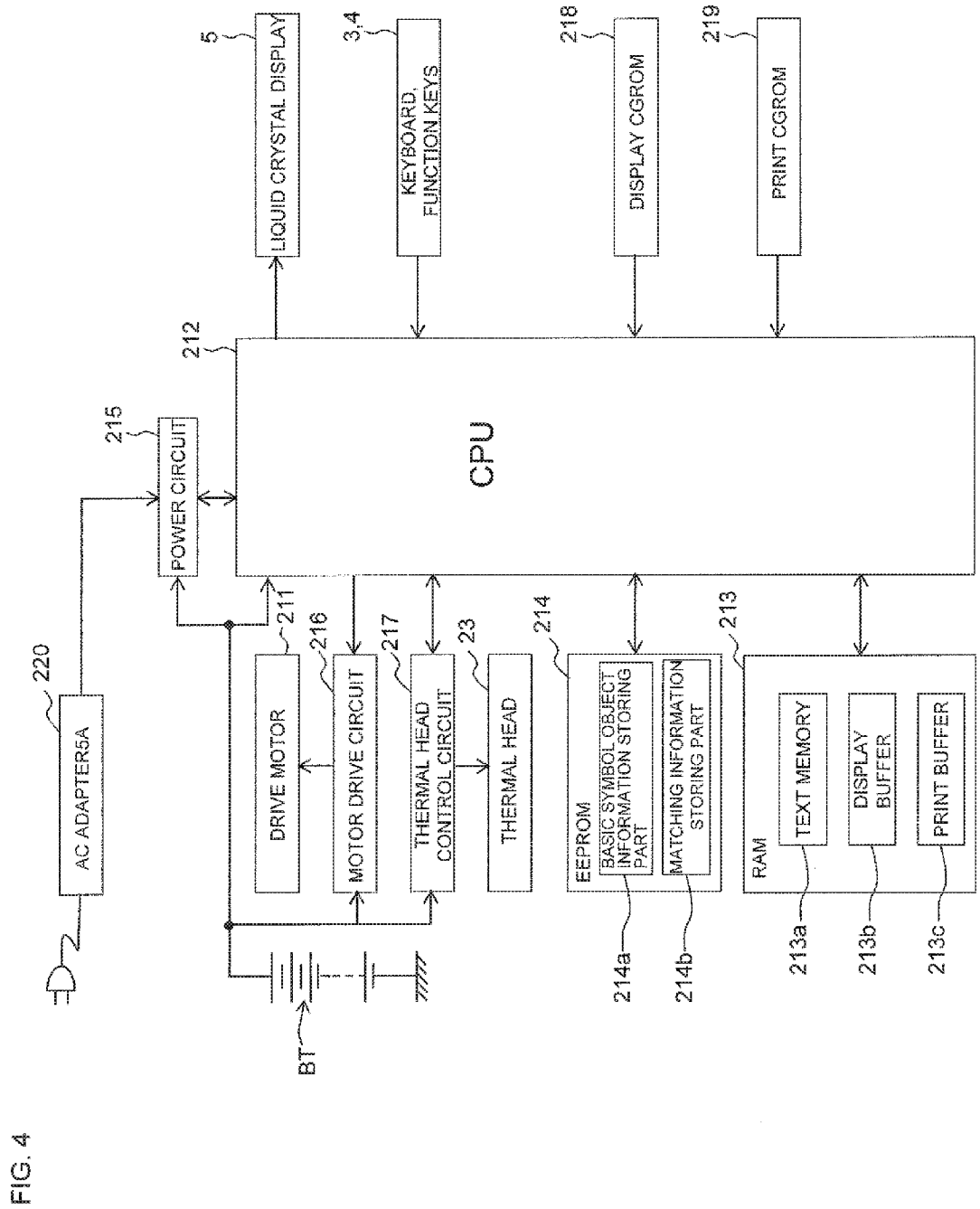
FIG. 4 is a functional block diagram of a control system of the printer.

Referring then to FIG. 4, a control system of the printer 1 will be described.

As shown in FIG. 4, the printer 1 includes a CPU 212 performing predetermined calculations.

The CPU 212 connects to the keyboard 3, the function keys 4, the liquid crystal display 5, a character generator ROM for display (display CGROM) 218, a character generator ROM for print (print CGROM) 219, an EEPROM 214, and a RAM 213. The CPU 212 connects also to a power circuit 215 connected to an AC adapter 220 and carrying out an ON/OFF process of a power source of the printer 1, a motor drive circuit 216 carrying out drive control of the drive motor 211 that drives the ribbon take-up roller drive shaft 107 and the tape feed roller drive shaft 108, and a thermal head control circuit 217 carrying out energization control of the heater elements of the thermal head 23.

The display CGROM 218 stores display dot pattern data that are prepared in advance respectively for displays of a plurality of types of characters in such a manner that a unique character code is assigned to each of the characters (details will be described later).

The print CGROM 219 stores print dot pattern data that are prepared in advance respectively for formation of prints of a plurality of types of characters in such a manner that a proper character code is assigned to each of the characters (details will be described later).

The EEPROM 214 stores various control programs (including a print processing program executing steps of a flowchart shown in FIG. 12 described later). The CPU 212 performs signal processing in accordance with a program stored in the EEPROM 214 while utilizing a temporary storage function of the RAM 213, thereby carrying out control of the entire printer 1. The EEPROM 214 includes a basic pictorial symbol information storing part 214*a* (details will be described later) and a matching information storing part 214*b* (details will be described later).

The RAM 213 includes a text memory 213*a*, a display buffer 213*b*, and a print buffer 213*c*.

The text memory 213*a* sequentially stores text data (character codes) corresponding to a character input via the keyboard 3, etc.

The display buffer 213*b* sequentially stores display dot pattern data sequentially read from the display CGROM 218 in accordance with the character input via the keyboard 3, etc. so that based on the display dot pattern data stored in the display buffer 213*b*, the CPU 112 outputs a control signal to the liquid crystal display 5, causing the liquid crystal display 5 to display a text corresponding to the character input via the keyboard 3, etc.

The print buffer 213*c* sequentially stores print dot pattern data sequentially read from the print CGROM 219 in accordance with text data (character data) stored in the text memory 213*a* so that based on print data in the form of print dot pattern data stored in the print buffer 213*c*, the CPU 112 drives the thermal head control circuit 217 to cause the thermal head 23 to form a print of a text corresponding to the character input via the keyboard 3, etc., on the cover film 103.

<Feature of this Embodiment>

A feature of this embodiment lies in that print data containing a intended pictorial symbol intended by the operator are generated by combining a plurality of dot pattern data for partial print of partial pictorial symbols each being a part of the pictorial symbol. Details thereof will be described hereinbelow.

<Pictorial Symbol>

This embodiment defines in advance partial pictorial symbols some (two in this example) of which are combined into a single pictorial symbol, for some pictorial symbols (e.g., a pictorial symbol of an animation character) among a plurality of types of pictorial symbols. Hereinafter, a pictorial symbol having no partial pictorial symbols defined therefor is referred to appropriately as "general pictorial symbol", while a pictorial symbol having partial pictorial symbols defined therefor is referred to as "special pictorial symbol". The special pictorial symbol includes a basic pictorial symbol BP (see FIG. 9B described later) with a basic pattern design, and a modified pictorial symbol with a pattern design different from that of the basic pictorial symbol BP, the basic pictorial symbol BP and the modified pictorial symbol being defined in advance.

<Display Dot Pattern Data>

The display CGROM 218 stores display dot pattern data of each of a plurality of types of characters in the form of partial pictorial symbols, in such a manner that a character code is assigned to each of the characters. Thus, the display CGROM 218 stores a plurality of types of display dot pattern data of letters, signs, and general pictorial symbols, and a plurality of types of partial-display dot pattern data as display dot pattern data of partial pictorial symbols.

In this example, the display CGROM 218 stores, as partial-display dot pattern data, left-part display dot pattern data of a left-part pictorial symbol LP (see FIG. 9D described later) corresponding to a left-half pattern design of a pictorial symbol, right-part display dot pattern data of a right-part pictorial symbol RP (see FIG. 9E described later) corresponding to a right-half pattern design of the pictorial symbol, upper-part display dot pattern data of an upper-part pictorial symbol UP (see FIG. 10B described later) corresponding to an upper-half pattern design of the pictorial symbol, and lower-part display dot pattern data of a lower-part pictorial symbol DP (see FIG. 10C described later) corresponding to a lower-half pattern design of the pictorial symbol.

In order to allow the basic pictorial symbol BP to be displayed in a different mode from the display in the form of combinations of partial-display dot pattern data of two partial pictorial symbols making up the basic pictorial symbol, the display CGROM 218 stores a plurality of types of different-mode display dot pattern data that are previously prepared display dot pattern data. Hereinafter, the basic pictorial symbol displayed based on the different-mode display dot pattern data is referred to appropriately as "different-mode pictorial symbol".

Figure 5:
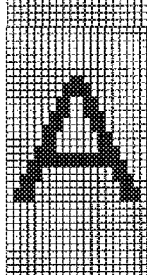
FIG. 5 is a table showing storage contents of a display CGROM.

FIG. 5 shows an example of storage contents of the display CGROM 218.

In an example of FIG. 5, display dot pattern data of a character "A" is assigned to a character code "0001" for example, which are stored together in the display CGROM 218. Left-part display dot pattern data of a left-part pictorial symbol LP1 in relation to a human pictorial symbol is assigned to a character code "1001" for example, which are stored together. Right-part display dot pattern data of a right-part pictorial symbol RP1 in relation to the human pictorial symbol is assigned to a character code "2001" for example, which are stored together. Different-mode display dot pattern data of a different-mode pictorial symbol BP1' in relation to the human pictorial symbol is assigned to a character code "3001" for example, which are stored together. At this time, as shown, the display dot pattern data of the left-part pictorial symbol LP1, right-part pictorial symbol RP1, and different-mode pictorial symbol BP1' have each a data size (the number of vertical dots×the number of horizontal dots) equal to that of the display dot pattern data of a single character (character "A" in this example).

<Print Dot Pattern Data>

The print CGROM 219 stores print dot pattern data of a plurality of types of characters in the form of a plurality of types of partial pictorial symbols, in such a manner that character codes are assigned respectively to the characters. More specifically, the print CGROM 219 stores a plurality of types of print dot pattern data of characters, signs, and general pictorial symbols, and a plurality of types of print display dot pattern data that are print dot pattern data of partial pictorial symbols.

In this example, the print CGROM 219 stores, as the partial print dot pattern data, the left-part print dot pattern data of the left-part pictorial symbol LP, the right-part print dot pattern data of the right-part pictorial symbol RP, the upper-part print dot pattern data of the upper-part pictorial symbol UP, and the lower-part print dot pattern data of the lower-part pictorial symbol DP.

FIG. 6 shows an example of storage contents of the print CGROM 219.

In an example of FIG. 6, display dot pattern data of the character "A" is assigned to the character code "0001", which are stored together in the print CGROM 219. Left-part print dot pattern data of the left-part pictorial symbol LP1 is assigned to the character code "1001", which are stored together. Right-part print dot pattern data of the right-part pictorial symbol RP1 is assigned to the character code "2001", which are stored together. At this time, as shown, the print dot pattern data of the left-part pictorial symbol LP1 and right-part pictorial symbol RP1 have each a data size (the number of vertical dots×the number of horizontal dots) equal to that of the print dot pattern data of a single character (character "A" in this example).

<Basic Pictorial symbol Information>

FIG. 7 shows an example of storage contents of the basic pictorial symbol information storing part 214a.

As shown in FIG. 7, a corresponding character code is stored for each of the basic pictorial symbols BP in the basic pictorial symbol information storing part 214a. In this example, for each of the basic pictorial symbols BP, character codes (see item "character code (1)" in the diagram) corresponding to two partial pictorial symbols making up the basic pictorial symbol BP are correlated with and stored together with a character code (see item "character code (2)" in the diagram) corresponding to the different-mode pictorial symbol in relation to the basic pictorial symbol BP.

<Matching Information>

FIG. 8 shows an example of storage contents of the matching information storing part 214b.

As shown in FIG. 8, the matching information storing part 214b stores matching information indicative of whether combinations between a plurality of types of partial pictorial symbols are possible or not, i.e., indicative of whether combinations between a plurality of types of the left-part pictorial symbols LP and a plurality of types of the right-part pictorial symbols RP are possible or not and whether combinations between a plurality of types of the lower-part pictorial symbols DP and a plurality of types of the upper-part pictorial symbols UP are possible or not. In the example of FIG. 8, using partial pictorial symbol identification information as the character codes, possible combinations between two partial pictorial symbols have "○" in corresponding columns, whereas impossible combinations between two partial pictorial symbols have "×" in corresponding columns.

<Print Label Production Flow>

Referring then to FIGS. 9A to 9G, a flow will be described that produces a print label L on which a text containing the special pictorial symbol is printed.

<Text Input>

In FIGS. 9A to 9G, in this embodiment, a text editing screen 5A for text input appears on the liquid crystal display 5 through the operator's appropriate operation of the keyboard 3, the function keys 4, etc.

In this state, the operator operates the keyboard 3, the function keys 4, etc., to input a text. In this example, the operator operates the keyboard 3 to input characters "A", "B", and "C" in sequence.

Figure 9:
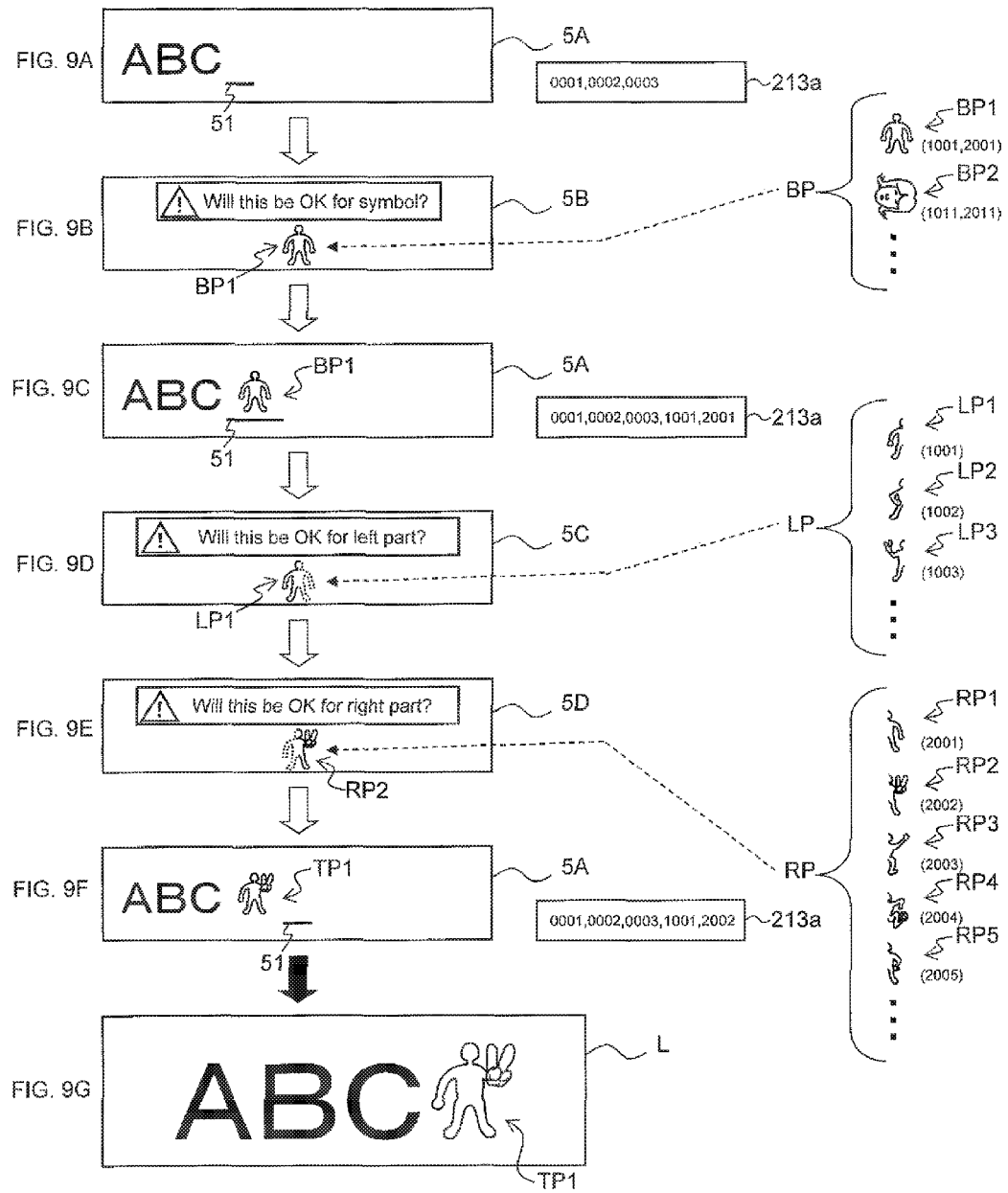
FIG. 9A is an explanatory view for explaining a flow along which a print label is produced.
FIG. 9B is an explanatory view for explaining the flow along which the print label is produced.
FIG. 9C is an explanatory view for explaining the flow along which the label is produced.
FIG. 9D is an explanatory view for explaining the flow along which the label is produced.
FIG. 9E is an explanatory view for explaining the flow along which the label is produced.
FIG. 9F is an explanatory view for explaining the flow along which the label is produced.
FIG. 9G is an explanatory view for explaining the flow along which the label is produced.

In this case, display dot pattern data assigned with character codes corresponding respectively to the characters "A", "B", and "C" are sequentially read from the display CGROM 218 and are sequentially deployed in the display buffer 213b, allowing the characters "A", "B", and "C" to be displayed on the text editing screen 5A as shown in FIG. 9A.

At this time, the character codes corresponding respectively to the characters "A", "B", and "C" are sequentially stored in the text memory 213a. In this example, the text memory 213a stores in sequence a character code "0001" corresponding to the character "A", a character code "0002" corresponding to the character "B", and a character code "0003" corresponding to the character "C".

<Selection of Basic Pictorial Symbol>

Afterward, the operator operates the function keys 4 for example to perform an operation intending to input a special pictorial symbol at a position of a cursor 51 on the text editing screen 5A.

In this case, the basic pictorial symbol information storing part 214a is referred to so that for each of a plurality of types of basic pictorial symbols BP, partial display dot pattern data of two partial pictorial symbols making up the basic pictorial symbol BP are extracted from the display CGROM 218 and are combined together, whereupon on a basic pictorial symbol selection screen 5B, as shown in FIG. 9B, transitioned from the text editing screen 5A (or the text editing screen 5A may continue), a plurality of types of basic pictorial symbols BP are displayed browsably by scrolling for example (or may be displayed on another screen or in another window). In this example, a basic pictorial symbol BP1 in relation to the human pictorial symbol, a basic pictorial symbol BP2 in relation to a pictorial symbol of a woman's face, etc., are previously defined as the basic pictorial symbols BP so that these basic pictorial symbols BP1, BP2, etc., are displayed browsably on the basic pictorial symbol selection screen 5B.

At this time, the basic pictorial symbol BP1 is displayed by combining, so as to align left to right (in the direction corresponding to the screen length direction) unchangedly, left-part display dot pattern data of the left-part pictorial symbol LP1 (see also FIG. 9D described later) assigned with the character code "1001" and right-part display dot pattern data of the right-part pictorial symbol RP1 (see also FIG. 9E described later) assigned with the character code "2001". The basic pictorial symbol BP2 is displayed by combining, so as to align left to right unchangedly, lower-part display dot pattern data of the lower-part pictorial symbol DP1 (see FIG. 10C described later) assigned with a character code "1011", in relation to the pictorial symbol of the woman's face and upper-part display dot pattern data of the upper-part pictorial symbol UP1 (see FIG. 10B described later) assigned with the character code "2001".

In this state, the operator operates the keyboard 3, the function keys 4, etc., to perform a selecting operation of selecting an intended one (a plurality of ones may be selectable) among the basic pictorial symbols BP displayed on the basic pictorial symbol selection screen 5B. In this example, the operator operates the keyboard 3, the function keys 4, etc., to select a basic pictorial symbol BP1 as shown in FIG. 9C At this time, a confirmation message "Will this be OK for symbol?" appears together on the basic pictorial symbol selection screen 5B.

In this case, when the operator operates the keyboard 3, the function keys 4, etc., to perform an appropriate confirmation operation in accordance with the confirmation message, left-part display dot pattern data of the left-part pictorial symbol LP1 and right-part display dot pattern data of the right-part pictorial symbol RP1 in relation to the selected basic pictorial symbol BP1 are sequentially deployed after display dot pattern data of each of the characters "A", "B", and "C" on the display buffer 213*b*, which are combined together so as to align left to right unchangedly, whereupon as shown in FIG. 9C, the basic pictorial symbol BP1 obtained by combining the left-part pictorial symbol LP1 and the right-part pictorial symbol RP1 after the characters "A", "B", and "C" is displayed on the text editing screen 5A transitioned from the basic pictorial symbol selection screen 5B. At this time, the display of the basic pictorial symbol BP1 is treated as two characters.

Simultaneously, the text memory 213*a* stores in sequence the character codes "1001" and "2001" corresponding to the basic pictorial symbol BP1 after character codes "0001", "0002", and "0003" corresponding to the characters "A", "B", and "C", respectively.

<Pattern Design Change of Basic Pictorial Symbol>

Subsequently, the operator operates the keyboard 3, the function keys 4, etc., to perform a selecting operation for selecting one of basic pictorial symbols BP displayed on the text editing screen 5A, as a basic pictorial symbol BP whose pattern design is intended to be changed. In this example, as shown in FIG. 9C, the operator operates the keyboard 3, the function keys 4, etc., to move the cursor 51 to a position of the basic pictorial symbol BP1, to select the basic pictorial symbol BP1. At this time, the display of the cursor 51 moved to the position of the basic pictorial symbol BP1 is treated as two characters (i.e. is of a length approximately twice the ordinary cursor length treated as one character).

In this case, the matching information stored in the matching information storing part 214*b* is referred to so that left-part display dot pattern data of left-part pictorial symbols LP combinable with the right-part pictorial symbol RP1 corresponding to the right-half pattern design of the basic pictorial symbol BP1 (or replaceable with the left-part pictorial symbol LP1 corresponding to the left-half pattern design of the basic pictorial symbol BP1) is extracted from the display CGROM 218, whereupon on a left-part pictorial symbol selection screen 5C, as shown in FIG. 9D, transitioned from the text editing screen 5A (or the text editing screen 5A may continue), the left-part pictorial symbols LP combinable with the right-part pictorial symbol RP1 are displayed browsably by scrolling for example (or may be displayed on another screen or in another window). This example defines in advance, as the left-part pictorial symbols LP combinable with the right-part pictorial symbol RP1, the left-part pictorial symbol LP1 assigned with the character code "1001", a left-part pictorial symbol LP2 assigned with a character code "1002" for example, a left-part pictorial symbol LP3 assigned with a character code "1003" for example, etc., in relation to the human pictorial symbol so that these left-part pictorial symbols LP1 to LP3, etc., are displayed browsably on the left-part pictorial symbol selection screen 5C.

In this state, the operator operates the keyboard 3, the function keys 4, etc., to perform a selecting operation of selecting a intended one among the left-part pictorial symbols LP displayed on the left-part pictorial symbol selection screen 5C. In this example, the operator operates the keyboard 3, the function keys 4, etc., to select the left-part pictorial symbol LP1 (i.e., the left-part pictorial symbol LP is unchanged) as shown in FIG. 9D. At this time, a confirmation message "Will this be OK for left part?" appears together on the left-part pictorial symbol selection screen 5C.

In this case, when the operator operates the keyboard 3, the function keys 4, etc., to perform an appropriate confirmation operation in accordance with the confirmation message, the matching information stored in the matching information storing part 214*b* is referred to so that right-part display dot pattern data of right-part pictorial symbol RP combinable with the selected left-part pictorial symbol LP1 (or replaceable with the right-part pictorial symbol RP1 corresponding to the right-half pattern design of the basic pictorial symbol BP1) is extracted from the display CGROM 218, whereupon on a right-part pictorial symbol selection screen 5D, as shown in FIG. 9E, transitioned from the left-part pictorial symbol selection screen 5C (or the text editing screen 5A may continue), the right-part pictorial symbols RP combinable with the left-part pictorial symbol LP1 are displayed browsably by scrolling for example (or may be displayed on another screen or in another window). This example predefines, as the right-part pictorial symbols RP combinable with the left-part pictorial symbol LP1, the right-part pictorial symbol RP1 assigned with the character code "2001", a right-part pictorial symbol RP2 assigned with a character code "2002" for example, a right-part pictorial symbol RP3 assigned with a character code "2003"

for example, a right-part pictorial symbol RP4 assigned with a character code "2004" for example, a right-part pictorial symbol RP5 assigned with a character code "2005" for example, etc., in relation to the human pictorial symbol so that these right-part pictorial symbols RP1 to RP5, etc., are displayed browsably on the right-part pictorial symbol selection screen 5D.

In this state, the operator operates the keyboard 3, the function keys 4, etc., to perform a selecting operation of selecting a intended one among the right-part pictorial symbols RP displayed on the right-part pictorial symbol selection screen 5D. In this example, the operator operates the keyboard 3, the function keys 4, etc., to select the right-part pictorial symbol RP2 as shown in FIG. 9E. At this time, a confirmation message "Will this be OK for right part?" appears together on the left-part pictorial symbol selection screen 5D.

In this case, when the operator operates the keyboard 3, the function keys 4, etc., to perform an appropriate confirmation operation in accordance with the confirmation message, the left-part display dot pattern data of the left-part pictorial symbol LP1 and the right-part display dot pattern data of the right-part pictorial symbol RP1, in relation to the basic pictorial symbol BP1, following the display dot pattern data of each of the characters "A", "B", and "C" are replaced, in the display buffer 213b, with left-part display dot pattern data of the selected left-part pictorial symbol LP1 and the left-part display dot pattern data of the selected right-part pictorial symbol RP2, respectively, so that on the text editing screen 5A transitioned from the right-part pictorial symbol selection screen 5D, a modified pictorial symbol TP1 in the form of a combination of the left-part pictorial symbol LP1 and the right-part pictorial symbol RP2 is displayed, in place of the basic pictorial symbol BP1, posterior to the characters "A", "B", and "C" as shown in FIG. 9F. At this time, the display of the modified pictorial symbol TP1 is also treated as two characters.

At this time, in the text memory 213a, the character codes "1001" and "2001" corresponding to the basic pictorial symbol BP1 following the character codes "0001", "0002", and "0003" corresponding to the characters "A", "B", and "C", respectively, are replaced with the character codes "1001" and "2002" corresponding to the modified pictorial symbol TP1.

<Print Label Production>

Subsequently, the operator operates the printing key 4C to perform a determining operation of determining a text displayed on the text editing screen 5A as a text to be printed on the print label L. In this example, the operator operates the printing key 4C to determine a text comprised of the characters "A", "B", and "C", and the modified pictorial symbol TP1.

In this case, text data stored in the text memory 213a (in other words, based on the character codes replaced as above) are referred to so that print dot pattern data of the characters "A", "B", and "C", left-part print dot pattern data of the left-part pictorial symbol LP1, and right-part print dot pattern data of the right-part pictorial symbol RP2 are sequentially read from the print CGROM 219 and are sequentially deployed in the print buffer 213c, whereby the left-part print dot pattern data of the left-part pictorial symbol LP1 and the right-part print dot pattern data of the right-part pictorial symbol RP2 are combined so as to align left to right (in the direction corresponding to the tape length direction) unchangedly, thus producing print data containing a text comprised of the characters "A", "B", and "C" and the modified pictorial symbol TP1. This allows the production of a print label L on which the text comprised of the characters "A", "B", and "C" and the modified pictorial symbol TP1 is printed, as shown in FIG. 9G.

<Combination Example of Rotation-Processed Partial Print Dot Pattern Data>

Referring to FIGS. 10A to 10E, an example will be described below in which partial print dot pattern data are combined in a rotated manner.

In FIGS. 10A to 10E, with the basic pictorial symbol selection screen 5B being displayed, the operator operates the keyboard 3, the function keys 4, etc., to select the basic pictorial symbol BP2.

Figure 10:
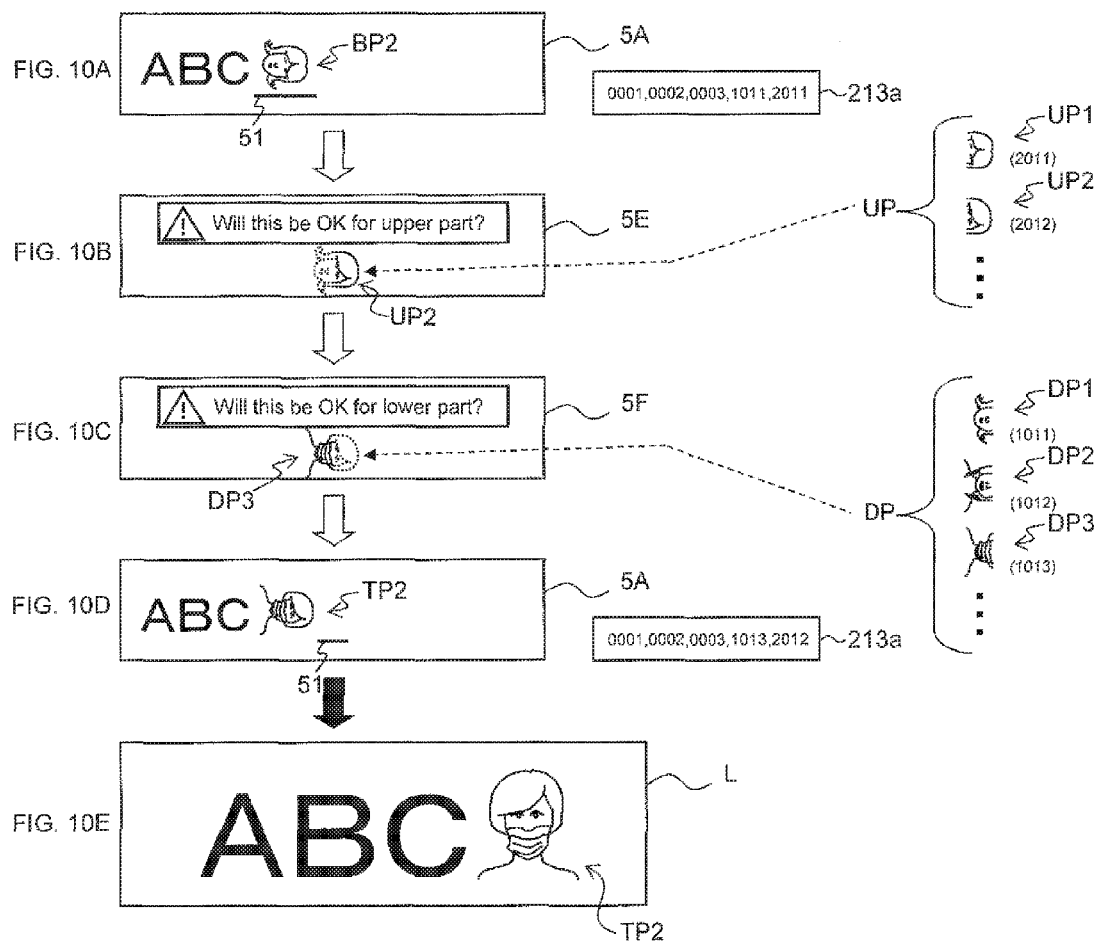
FIG. 10A is an explanatory view for explaining an example in which dot pattern data for partial print are combined after a rotation process.
FIG. 10B is an explanatory view for explaining the example in which dot pattern data for partial print are combined after the rotation process.
FIG. 10C is an explanatory view for explaining the example in which dot pattern data for partial print are combined after the rotation process.
FIG. 10D is an explanatory view for explaining the example in which dot pattern data for partial print are combined after the rotation process.
FIG. 10E is an explanatory view for explaining the example in which dot pattern data for partial print are combined after the rotation process.

In this case, when the operator operates the keyboard 3, the function keys 4, etc., to perform an appropriate confirmation operation in accordance with the confirmation message, the lower-part display dot pattern data of the lower-part pictorial symbol DP1 and the upper-part display dot pattern data of the upper-part pictorial symbol UP1, in relation to the selected basic pictorial symbol BP2, following the display dot pattern data of each of the characters "A", "B", and "C" are sequentially deployed in the display buffer 213b and are thereby combined so as to align left to right unchangedly, whereupon on the text editing screen 5A, as shown in FIG. 10A, transitioned from the basic pictorial symbol selection screen 5B, the basic pictorial symbol BP2 in the form of a combination of the lower-part pictorial symbol DP1 and the upper-part pictorial symbol UP1 is displayed posterior to the characters "A", "B", and "C". At this time, the display of the basic pictorial symbol BP2 is treated as two characters.

At this time, in the text memory 213a, the character code "1011" and a character code "2011" corresponding to the basic pictorial symbol BP2 are sequentially stored posterior to the character codes "0001", "0002", and "0003" corresponding to the characters "A", "B", and "C", respectively.

Assume that subsequently, the operator operates the keyboard 3, the function keys 4, etc., to move the cursor 51 to the position of the basic pictorial symbol BP2 to select the basic pictorial symbol BP2. At this time, the display of the cursor 51 moved to the position of the basic pictorial symbol BP2 is treated as two characters.

In this case, the matching information stored in the matching information storing part 214b is referred to so that upper-part display dot pattern data of upper-part pictorial symbols UP combinable with the lower-part pictorial symbol DP1 corresponding to the lower-half pattern design of the basic pictorial symbol BP2 (or replaceable with the upper-part pictorial symbol UP1 corresponding to the upper-half pattern design of the basic pictorial symbol BP2) are extracted from the display CGROM 218, whereupon on an upper-part pictorial symbol selection screen 5E, as shown in FIG. 10B, transitioned from the text editing screen 5A (or the text editing screen 5A may continue), upper-part substrate UP combinable with the lower-part pictorial symbol DP1 are displayed browsably by scrolling for example (or may be displayed on another screen or in another window). This example predefines, as the upper-part pictorial symbols UP combinable with the lower-part pictorial symbol DP1, the upper-part pictorial symbol UP1 assigned with the character code "2011", an upper-part pictorial symbol UP2 assigned with a character code "2012" for example, etc., in relation to the women's face pictorial symbol so that these upper-part pictorial symbols UP1, UP2, etc., are displayed browsably on the upper-part pictorial symbol selection screen 5E.

In this state, the operator operates the keyboard 3, the function keys 4, etc., to perform a selecting operation of selecting an intended one among the upper-part pictorial symbols UP displayed on the upper-part pictorial symbol selection screen 5E. In this example, the operator operates the keyboard 3, the function keys 4, etc., to select the upper-part pictorial symbol UP2 as shown in FIG. 10B. At this time, a confirmation message "Will this be OK for upper part?" appears together on the upper-part pictorial symbol selection screen 5E.

In this case, when the operator operates the keyboard 3, the function keys 4, etc., to perform an appropriate confirmation operation in accordance with the confirmation message, the matching information stored in the matching information storing part 214b is referred to so that lower-part display dot pattern data of lower-part pictorial symbols DP combinable with the selected upper-part pictorial symbol UP2 (or replaceable with the lower-part pictorial symbol DP1 corresponding to the lower-half pattern design of the basic pictorial symbol BP2) is extracted from the display CGROM 218, whereupon on a lower-part pictorial symbol selection screen 5F, as shown in FIG. 10C, transitioned from the upper-part pictorial symbol selection screen 5E (or the text editing screen 5A may continue), the lower-part pictorial symbols DP combinable with the upper-part pictorial symbol UP2 are displayed so as to be browsable by scrolling for example (or may be displayed on another screen or in another window). This example predefines, as the lower-part pictorial symbols DP combinable with the upper-part pictorial symbol UP1, the lower-part pictorial symbol DP1 assigned with the character code "1011", a lower-part pictorial symbol DP2 assigned with a character code "1012" for example, a lower-part pictorial symbol DP3 assigned with a character code "1013" for example, etc., in relation to the woman's face pictorial symbol so that these lower-part pictorial symbols DP1 to DP3, etc., are displayed browsably on the lower-part pictorial symbol selection screen 5F.

In this state, the operator operates the keyboard 3, the function keys 4, etc., to perform a selecting operation of selecting a intended one among the lower-part pictorial symbols DP displayed on the lower-part pictorial symbol selection screen 5F. In this example, the operator operates the keyboard 3, the function keys 4, etc., to select the lower-part pictorial symbol DP3 as shown in FIG. 10C. At this time, a confirmation message "Will this be OK for lower part?" appears together on the lower-part pictorial symbol selection screen 5F.

In this case, when the operator operates the keyboard 3, the function keys 4, etc., to perform an appropriate confirmation operation in accordance with the confirmation message, the lower-part display dot pattern data of the lower-part pictorial symbol DP1 and the upper-part display dot pattern data of the upper-part pictorial symbol UP1, in relation to the basic pictorial symbol BP2, following the display dot pattern data of each of the characters "A", "B", and "C" are replaced, in the display buffer 213b, with lower-part display dot pattern data of the selected lower-part pictorial symbol DP3 and the upper-part display dot pattern data of the selected upper-part pictorial symbol UP2, respectively, so that on the text editing screen 5A, as shown in FIG. 10D, transitioned from the lower-part pictorial symbol selection screen 5F, a modified pictorial symbol TP2 in the form of a combination of the lower-part pictorial symbol DP3 and the upper-part pictorial symbol UP2 is displayed, in place of the basic pictorial symbol BP2, posterior to the characters "A", "B", and "C". At this time, the display of the modified pictorial symbol TP2 is also treated as two characters.

At this time, in the text memory 213a, the character codes "1011" and "2011" corresponding to the basic pictorial symbol BP2 following the character codes "0001", "0002", and "0003" corresponding to the characters "A", "B", and "C", respectively, are replaced with the character codes "1013" and "2012" corresponding to the modified pictorial symbol TP2.

Assume that subsequently, the operator operates the printing key 4C to determine a text comprised of the characters "A", "B", and "C", and the modified pictorial symbol TP2.

In this case, text data (character codes) stored in the text memory 213a are referred to so that print dot pattern data of the characters "A", "B", and "C", lower-part print dot pattern data of the lower-part pictorial symbol DP3, and upper-part print dot pattern data of the upper-part pictorial symbol UP2 are sequentially read from the print CGROM 219 and are sequentially deployed in the print buffer 213c, whereby the lower-part print dot pattern data of the lower-part pictorial symbol DP3 and the upper-part print dot pattern data of the upper-part pictorial symbol UP2 are combined so as to align vertically (in the direction corresponding to the tape width direction) in a manner rotated 90 degrees counterclockwise, thus producing print data containing a text comprised of the characters "A", "B", and "C" and the modified pictorial symbol TP2. This allows the production of a print label L on which a text comprised of the characters "A", "B", and "C" and the modified pictorial symbol TP2 is printed, as shown in FIG. 10E.

<Basic Pictorial Symbol Process Example of Exclusion from Pattern Design Change Target>

In this embodiment, if a basic pictorial symbol BP not intended to change its pattern design is among the basic pictorial symbols BP displayed on the text editing screen 5A, it is possible for the operator to perform an exclusion process for preventing that basic pictorial symbol BP from becoming a pattern design change target.

Figure 11:
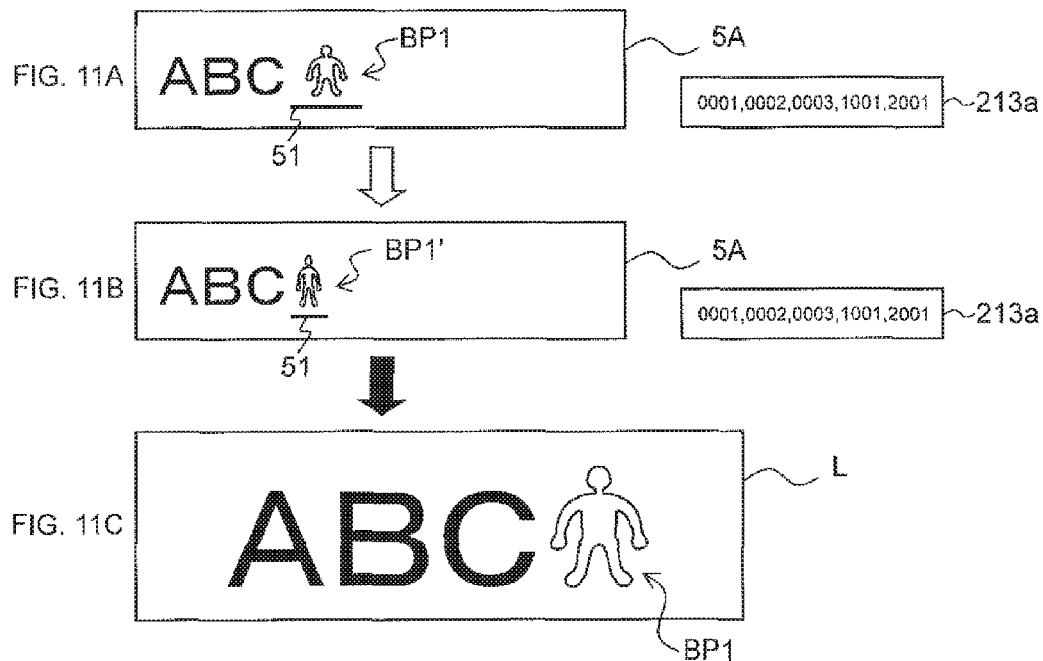
FIG. 11A is an explanatory view for explaining a process example in which a basic pictorial symbol is excluded so as not to become a pattern design change target.
FIG. 11B is an explanatory view for explaining the process example in which the basic pictorial symbol is excluded so as not to become a pattern design change target.
FIG. 11C is an explanatory view for explaining the process example in which the basic pictorial symbol is excluded so as not to become a pattern design change target.

Referring to FIGS. 11A to 11C, an example will be described below in which a basic pictorial symbol BP is subjected to an exclusion process so as not to become a pattern design change target.

In FIGS. 11A to 11C, with the text editing screen 5A being displayed, the operator operates the keyboard 3, the function keys 4, etc., to perform a selecting operation of selecting one of the basic pictorial symbols BP displayed on the text editing screen 5A as a basic pictorial symbol BP whose pattern design is not intended to be changed. In this example, as shown in FIG. 11A, the operator operates the keyboard 3, the function keys 4, etc., to move the cursor 51 to the position of the basic pictorial symbol BP1 to select the basic pictorial symbol BP1.

In this case, the selected basic pictorial symbol BP1 is subjected to an exclusion process (or is rendered unselectable) so as not to become a selection target of a selecting operation to be selected as a basic pictorial symbol BP intended to change its pattern design. The basic pictorial symbol information storing part 214a is then referred to so that display dot pattern data of the different-mode pictorial symbol BP1' in relation to the excluded basic pictorial symbol BP1 is extracted from the display CGROM 218, so that the left-part display dot pattern data of the left-part pictorial symbol LP1 and the right-part display dot pattern data of the right-part pictorial symbol RP1, in relation to the basic pictorial symbol BP1, following the display dot pattern data of each of the characters "A", "B", and "C" are replaced in the display buffer 213b with display dot pattern data of the extracted different-mode pictorial symbol BP1', whereupon on the text editing screen 5A as shown in FIG. 11B, the different-mode pictorial symbol BP1' is displayed, in lieu of the basic pictorial symbol BP1, posterior to the characters "A", "B", and "C". At this time, the display of the different-mode pictorial symbol BP1' is treated as one character, while the display of the cursor 51 moved to the position of the different-mode pictorial symbol BP1' is also treated as one character (half the length of that in the case of being treated as two characters) (see FIG. 11B).

At this time, the text data (character codes) in the text memory 213a are not replaced and remain unchanged, unlike the above case.

Assume that subsequently, the operator operates the printing key 4C to determine a text comprised of the characters "A", "B", and "C" and the different-mode pictorial symbol BP1'.

In this case, text data (character codes) stored in the text memory 213a are referred to so that print dot pattern data of the characters "A", "B", and "C", left-part print dot pattern data of the left-part pictorial symbol LP1, and right-part print dot pattern data of the right-part pictorial symbol RP1 are sequentially read from the print CGROM 219 and are sequentially deployed in the print buffer 213c, whereby the left-part print dot pattern data of the left-part pictorial symbol LP1 and the right-part print dot pattern data of the right-part pictorial symbol RP1 are combined so as to align left to right unchangedly, thus producing print data containing a text comprised of the characters "A", "B", and "C" and the basic pictorial symbol BP1. This allows the production of a print label L on which the text comprised of the characters "A", "B", and "C" and the basic pictorial symbol BP1 is printed, as shown in FIG. 11C.

<Control Procedure>

Figure 12:
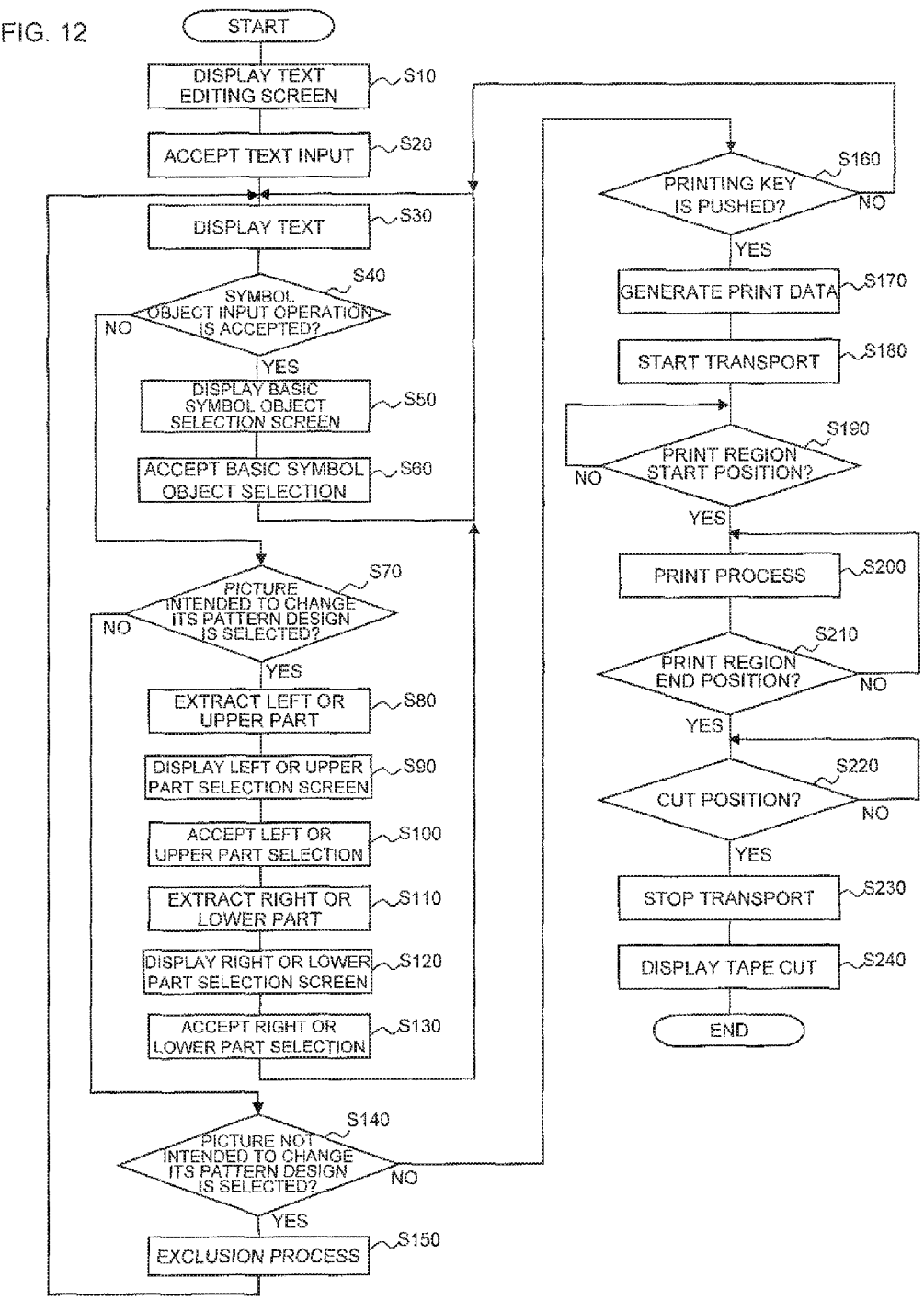
FIG. 12 is a flowchart showing a control procedure executed by a CPU.

Referring to FIG. 12, a process procedure will then be described that is executed by the CPU 212 to implement the above technique.

In FIG. 12, the operator for example operates the power switch 4B to thereby start the process of this flowchart ("START" position).

First, at step S10, the CPU 212 outputs a display signal to the liquid crystal display 5, allowing the display of the text editing screen 5A.

Afterward, at step S20, the CPU 212 accepts an operator's text input operation via the keyboard 3, the function keys 4, etc., to allow the text memory 213a to sequentially store character codes corresponding to the input text.

Then, at step S30, the CPU 212 sequentially read display dot pattern data assigned with character codes corresponding to the text input at step S20, from the display CGROM 218, and sequentially deploys them in the display buffer 213b, allowing the display of the text on the text editing screen 5A.

Thereafter, at step S40, the CPU 212 determines whether an operator's operation intending to input a special pictorial symbol via the function keys 4 is accepted. If the operation is accepted, the determination at step S40 is satisfied (S40: Yes), shifting to step S50.

At step S50, the CPU 212 outputs a display signal to the liquid crystal display 5, allowing it to display the basic pictorial symbol selection screen 5B. At this time, the CPU 212 refers to the basic pictorial symbol information storing part 214a, to extract partial display dot pattern data of each of two partial pictorial symbols making up each of a plurality of types of basic pictorial symbols BP, from the display CGROM 218, to combine them so that the plurality of types of basic pictorial symbols BP are displayed browsably on the basic pictorial symbol selection screen 5B.

Subsequently, at step S60, the CPU 212 accepts an operator's selecting operation, via the key board 3, the function keys 4, etc., of selecting an intended one among the basic pictorial symbols BP displayed on the basic pictorial symbol selection screen 5B, thus storing character codes corresponding to the selected basic pictorial symbol BP into the text memory 213a.

Afterward, returning to step S30, the CPU 212 sequentially deploys, in the display buffer 213b, two partial display dot pattern data assigned with two character codes corresponding to two partial pictorial symbols in relation to the basic pictorial symbol BP selected at step S60, to allow display of a text containing the basic pictorial symbol BP on the text editing screen 5A.

On the other hand, if the operation is not accepted at step S40, the determination at step S40 is not satisfied (S40:NO), shifting to step S70.

At step S70, the CPU 212 determines whether an operator's selecting operation via the key board 3, the function keys 4, of selecting one of the basic pictorial symbols BP displayed on the text editing screen 5A as a basic pictorial symbol BP intended to change its pattern design is accepted. If the selecting operation is accepted, the determination at step S70 is satisfied (S70:YES), proceeding to step S80.

At step S80, the CPU 212 refers to the matching information stored in the matching information storing part 214b, to extract, from the display CGROM 218, left-part display dot pattern data of the left-part pictorial symbols LP or upper-part display dot pattern data of the upper-part pictorial symbols UP combinable with the right-part pictorial symbol RP or the lower-part pictorial symbol DP in relation to the basic pictorial symbol BP selected at step S70 (or replaceable with the left-part pictorial symbol LP or the upper-part pictorial symbol UP in relation to the basic pictorial symbol BP1).

Then, at step S90, the CPU 212 outputs a display signal to the liquid crystal display 5 to allow display of the left-part pictorial symbol selection screen 5C or the upper-part pictorial symbol selection screen 5E. At this time, using the left-part display dot pattern data or the upper-part display dot pattern data extracted at step S80, the CPU 212 allows the left-part pictorial symbols LP or the upper-part pictorial symbols UP combinable with the right-part pictorial symbol LP or the lower-part pictorial symbol DP, in relation to the basic pictorial symbol BP selected at step S70 to be displayed browsably on the left-part pictorial symbol selection screen 5C or the upper-part pictorial symbol selection screen 5E.

Thereafter, at step S100, the CPU 212 accepts an operator's selecting operation, via the key board 3 or the function keys 4, of selecting a intended one among left-part pictorial symbols LP or upper-part pictorial symbols UP displayed on the left-part pictorial symbol selection screen 5C or the upper-part pictorial symbol selection screen 5E, to replace the character code corresponding to the left-part pictorial symbol LP or the upper-part pictorial symbol UP in relation to the basic pictorial symbol BP selected at step S70 in the text memory 213a with a character code corresponding to the selected left-part pictorial symbol LP or upper-part pictorial symbol UP.

At step S110, the CPU 212 refers to the matching information stored in the matching information storing part 214b, to extract, from the display CGROM 218, right-part display dot pattern data of the right-part pictorial symbols RP or lower-part display dot pattern data of the lower-part pictorial symbols DP combinable with the left-part pictorial symbol LP or the upper-part pictorial symbol UP selected at step S100 (or replaceable with the right-part pictorial symbol RP or the lower-part pictorial symbol DP in relation to the basic pictorial symbol BP1).

Then, at step S120, the CPU 212 outputs a display signal to the liquid crystal display 5 to allow display of the right-part pictorial symbol selection screen 5D or the lower-part pictorial symbol selection screen 5F. At this time, using the right-part display dot pattern data or the lower-part display dot pattern data extracted at step S110, the CPU 212 allows the right-part pictorial symbols RP or the lower-part pictorial symbols DP combinable with the left-part pictorial symbol LP or the upper-part pictorial symbol UP selected at S100 to be displayed browsably on the right-part pictorial symbol selection screen 5D or the lower-part pictorial symbol selection screen 5F.

Then, at step S130, the CPU 212 accepts an operator's selecting operation, via the key board 3 and the function keys 4, of selecting a intended one among right-part pictorial symbols RP or lower-part pictorial symbols DP displayed on the right-part pictorial symbol selection screen 5D or the lower-part pictorial symbol selection screen 5F, to replace the character code corresponding to the right-part pictorial symbol RP or the lower-part pictorial symbol DP in relation to the basic pictorial symbol BP selected at step S70 in the text memory 213a with a character code corresponding to the selected right-part pictorial symbol RP or lower-part pictorial symbol DP.

Thereafter, returning to step S30, the CPU 212 replaces, in the display buffer 213b, the left-part display dot pattern data of the left-part pictorial symbol LP or the lower-part display dot pattern data of the lower-part pictorial symbol DP in relation to the basic pictorial symbol BP selected at step S60 and the right-part display dot pattern data of the right-part pictorial symbol RP or the upper-part display dot pattern data of the upper-part pictorial symbol UP with left-part display dot pattern data of the left-part pictorial symbol LP selected at step S100 or lower-part display dot pattern data of the lower-part pictorial symbol DP selected at step S130 and right-part display dot pattern data of the right-part pictorial symbol RP selected at step S130 or upper-part display dot pattern data of the upper-part pictorial symbol UP selected at step S100, respectively, to consequently allow display of a text containing a modified pictorial symbol in the form of a combination of the selected left-part pictorial symbol LP or lower-part pictorial symbol DP and the selected right-part pictorial symbol RP or upper-part pictorial symbol UP, instead of the selected basic pictorial symbol BP, on the text editing screen 5A.

On the other hand, if the selecting operation is not accepted at step S70, the determination at step S70 is not satisfied (S70:NO), proceeding to step S140.

At step S140, the CPU 212 determines whether an operator's selecting operation via the keyboard 3 or the function keys 4 of selecting one of the basic pictorial symbols BP displayed on the text editing screen 5A as a basic pictorial symbol BP not intended to change its pattern design is accepted. If the selecting operation is accepted, the determination at step S140 is satisfied (S140:YES), proceeding to step S150.

Then, at step S150, the CPU 212 subjects the basic pictorial symbol BP selected at step S140 to an exclusion process so as not to become a selection target at step S70. The CPU 212 then refers to the basic pictorial symbol information storing part 214a to extract display dot pattern data of the different-mode pictorial symbol BP1' in relation to the excluded basic pictorial symbol BP from the display CGROM 218.

Afterward, returning to step S30, the CPU 212 replaces two partial display dot pattern data of the basic pictorial symbol BP excluded at step S150 with the display dot pattern data of the different-mode pictorial symbol BP1' extracted at step S150 in the display buffer 213b, to change display of the excluded basic pictorial symbol BP into display of the different-mode pictorial symbol BP1'.

On the other hand, if the selecting operation is not accepted at step S140, the determination at step S140 is not satisfied (S140:NO), proceeding to step S160.

At step S160, the CPU 212 determines whether the printing key 4C is pushed. If the printing key 4C is not pushed, the determination at step S160 is not satisfied (S160:NO), returning to step S30 to repeat the same procedure. This enables the above input operation up until the operator pushes the printing key 4C. If the printing key 4C is pushed, the determination at step S160 is satisfied (step S160:YES), proceeding to step S170.

At step S170, the CPU 212 refers to text data (character codes) stored in the text memory 213a, to sequentially read print dot pattern data assigned with character codes corresponding to the text from the print CGROM 219 and sequentially deploy them in the print buffer 213c, to thereby generate print data energizing the heater element of the thermal head 23, for executing a print formation corresponding to the text. At this time, in the case that text data (character codes) containing a special pictorial symbol are stored in the text memory 213a, the CPU 212 sequentially read two partial print dot pattern data assigned with two character codes corresponding to two partial pictorial symbols in relation to the special pictorial symbol and sequentially deploys them in the print buffer 213c, thereby combining these two partial print dot pattern data to generate print data corresponding to the text containing the special pictorial symbol.

Thereafter, at step S180, the CPU 212 outputs a control signal to the motor drive circuit 216 to start drive by the drive motor 211 of the tape feed roller drive shaft 108 and ribbon take-up roller drive shaft 107. This starts transport of the cover film 103, base tape 101, printed label tape 109 (hereinafter, referred to simply as "cover film 103, etc.).

Then, at step S190, the CPU 212 determines, based on the print data generated at step S170, whether the cover film 103, etc., transported as above are transported to a start position of a desired print area (in other words, whether the cover film 103, etc., are transported to a transport-direction position where the thermal head 23 confronts a leading end of the print area). This determination may be performed by a known appropriate technique, such as counting the number of pulses of the drive motor 211 in the form of a stepping motor for example. If the cover film 103, etc., are not transported to the print area start position, the determination at step S190 is not satisfied (S190:NO), resulting in loop waiting. If the cover film 103, etc., are transported to the print area start position, the determination at step S190 is satisfied (S190:YES), proceeding to step S200.

At step S200, the CPU 212 performs a print process of energizing the heater element of the thermal head 23, based on the print data generated at step S170. As a result, ink of the ink ribbon 105 is transferred onto the cover film 103 by the energized heater element so that a print corresponding to the print data is formed.

Afterward, at step S210, the CPU 212 determines whether the cover film 103, etc., transported as above are transported to a print area end position (in other words, whether the cover film 103, etc., are transported to a transport-direction position where the thermal head 23 confronts a trailing end of the print area). This determination may also be performed by the known technique similar to the above. If the cover film 103, etc., are not transported to the end position of the print area, the determination at step S210 is not satisfied (S210:NO), returning to step S200 to repeat the similar procedure. If the cover film 103, etc., are transported to the print area end position, the determination at step S210 is satisfied (S210:YES), proceeding to step S220.

At step S220, the CPU 212 determines, based on the print data generated at step S170, whether the transported cover film 103, etc., are transported to a desired cut position set at a label trailing end side with respect to the print area based on the pint data (in other words, whether the printed label tape 109 is transported to a transport-direction position where the movable blade 41 confronts the cut position). This determination may also be performed by the known technique similar to the above. If the cover film 103, etc., are not transported to the cut position, the determination at step S220 is not satisfied (S220:NO), resulting in loop waiting. If the cover film 103, etc., are transported to the cut position, the determination at step S220 is satisfied (S220:YES), proceeding to step S230.

At step S230, the CPU 212 outputs a control signal to the motor drive circuit 216, to stop drive by the drive motor 211 of the tape feed roller drive shaft 108 and ribbon take-up roller drive shaft 107. As a result, the transport of the cover film 103, etc., comes to a stop.

Then, at step S240, the CPU 212 outputs a display signal to the liquid crystal display 5. This allows the liquid crystal display 5 to provide an appropriate display urging the operator to operate the cutter lever 7 to activate the movable blade 41 to cut the printed label tape 109. In response to this display, the operator operates the cutter lever 7 so that the printed label tape 109 is cut to produce a print label. The processes of this flowchart are thus completed.

<Effects of this Embodiment>

As set forth hereinabove, according to this embodiment, when the operator determines a pictorial symbol intended to change its pattern design, it is possible to generate print data containing the pictorial symbol and form a print containing the pictorial symbol by combining two partial print dot pattern data of a partial pictorial symbol forming a part of the pictorial symbol, among a plurality of types of partial print dot pattern data prepared for each partial pictorial symbol in advance. That is, in the case of preparing print dot pattern data of a plurality of pictorial symbols each having partially a common pattern design but generally a different pattern design, it is sufficient for a partial pictorial symbol corresponding to the common pattern design portion to have single partial print dot pattern data. Accordingly, as compared with the case of preparing a plurality of types of print dot pattern data for each of the pictorial symbols, the data amount of the print dot pattern data to be prepared can be reduced. Furthermore, by changing the combination pattern of the partial print dot pattern data, print of a wide variety of pictorial symbols can be implemented.

In particular, this embodiment produces a print label L on which a print corresponding to print data is formed. This can reduce the data amount of print dot pattern data to be prepared for production of the print label L. Print of a wide variety of pictorial symbols can be implemented on the print label L.

In particular, when displaying a pictorial symbol on the text editing screen 5A, this embodiment combines two partial display dot pattern data of a partial pictorial symbol forming a part of the pictorial symbol, among a plurality of types of partial display dot pattern data prepared for each partial pictorial symbol in advance, to thereby enable the pictorial symbol to be displayed. That is, in the case of preparing display dot pattern data of a plurality of pictorial symbols each having partially a common pattern design but generally a different pattern design, it is sufficient for a partial pictorial symbol corresponding to the common pattern design portion to have single partial display dot pattern data. Accordingly, as compared with the case of preparing a plurality of types of display dot pattern data for each pictorial symbol, the data amount of the display dot pattern data to be prepared can be reduced. Furthermore, by changing the combination pattern of the partial display dot pattern data, display of a wide variety of pictorial symbols can be implemented.

That is, when preparing display dot pattern data of a plurality of pictorial symbols each having partially a common pattern design but generally a different pattern design, the data amount of print data to be prepared disadvantageously increases.

Particularly, in this embodiment, the print CGROM 219 stores a plurality of types of partial print dot pattern data in such a manner that a character code is assigned to each partial pictorial symbol, while the display CGROM 218 stores a plurality of types of partial display dot pattern data in such a manner that a character code is assigned to each partial pictorial symbol. This enables a partial pictorial symbol to be treated similarly as a character or a symbol, facilitating incorporation of the partial pictorial symbol into the printer 1.

Particularly, in this embodiment, the matching information storing part 214b stores information on matching between a plurality of types of partial pictorial symbols. Combining based thereon enables only data of partial pictorial symbols established as a pictorial symbol to be reliably combined.

Particularly, in this embodiment, on the text editing screen 5A displaying basic pictorial symbols BP selected from among a plurality of types of basic pictorial symbols BP set in advance, the operator selects a basic pictorial symbol BP intended to change its pattern design to appropriately change its pattern design, thereby enabling implementation of a wide variety of modified pictorial symbols that are modifications of the basic pictorial symbol BP.

In particular, this embodiment subjects a basic pictorial symbol BP selected by the operator to an exclusion process so as not to become a selection target of pattern design change. This can prevent the operator from erroneously selecting a basic pictorial symbol BP not intended to change its pattern design as the pattern design change target, thus contributing to an improvement of the operator's convenience.

Particularly, in this embodiment, display of the excluded basic pictorial symbol BP on the text editing screen 5A is changed from display in the form of a combination of two partial display dot pattern data in relation to that basic pictorial symbol BP to display using display dot pattern data of the different-mode pictorial symbol in relation to that basic pictorial symbol BP. As a result, on the text editing screen 5A, the basic pictorial symbol BP disabling the pattern design change can be displayed in a mode different from the other pictorial symbols (in the above example, the basic pictorial symbol BP disabling the pattern design change can be displayed smaller than the other pictorial symbols). As a result, it is possible for the operator to easily distinguish the basic pictorial symbol BP disabling the pattern design change from the other pictorial symbols on the text editing screen 5A, contributing to a further improvement in the operator's convenience.

<Modification Examples, etc.>

The present disclosure is not limited to the above embodiment, but can variously be modified without departing from the spirit and technical idea thereof. Such modification examples will be described hereinbelow.

(1) Case where Production of Pictorial Symbol with Wide Pattern Design is Feasible In this modification example, the display CGROM 218 further stores, as partial display dot pattern data, left-to-right intermediate-part display dot pattern data of left-to-right intermediate-part pictorial symbol capable of being disposed between the left-part pictorial symbol LP and the right-part pictorial symbol RP. The print CGROM 219 further stores, as partial print dot pattern data, left-to-right intermediate-part print dot pattern data (intermediate partial data) of the left-to-right intermediate-part pictorial symbol.

The CPU 212 replaces, in the display buffer 213*b*, left-part display dot pattern data and right-part display dot pattern data of the basic pictorial symbol BP with left-part display dot pattern data, one or more left-to-right intermediate-part display dot pattern data, and right-part display dot pattern data extracted from the above selecting operation (or incorporates left-to-right intermediate-part display dot pattern data between the left-part display dot pattern data and the right-part display dot pattern data of the basic pictorial symbol BP), whereby on the text editing screen 5A, a modified pictorial symbol with a horizontally wide pattern design can be displayed in the form of a combination of the left-part pictorial symbol LP, the one or more left-to-right intermediate-part pictorial symbols, and the right-part pictorial symbol RP, in place of the basic pictorial symbol BP. The CPU 212 replaces, in the print buffer 213*c*, left-part print dot pattern data and right-part print dot pattern data of the basic pictorial symbol BP with left-part print dot pattern data, one or more left-to-right intermediate-part print dot pattern data, and right-part print dot pattern data extracted from the above selecting operation (or incorporates left-to-right intermediate-part print dot pattern data between the left-part print dot pattern data and the right-part print dot pattern data of the basic pictorial symbol BP), thereby enabling production of a print data containing a modified pictorial symbol with a laterally wide pattern design in the form of a combination of the left-part pictorial symbol LP, the one or more left-to-right intermediate-part pictorial symbols, and the right-part pictorial symbol RP, and production of a print label L on which the modified pictorial symbol is printed.

The display CGROM 218 may store, as the partial display dot pattern data, top-to-bottom intermediate-part display dot pattern data of top-to-bottom intermediate-part arrangeable between the upper-part pictorial symbol UP and the lower-part pictorial symbol DP, while the print CGROM 219 may store, as the partial print dot pattern data, top-to-bottom intermediate-part print dot pattern data (intermediate-part print data) of the top-to-bottom intermediate-part pictorial symbol, to thereby perform display and print of a modified pictorial symbol with a longitudinally wide pattern design in the form of a combination of the lower-part pictorial symbol DP, one or more to-to-bottom intermediate-part pictorial symbols, and the upper-part pictorial symbol UP.

Figure 13:
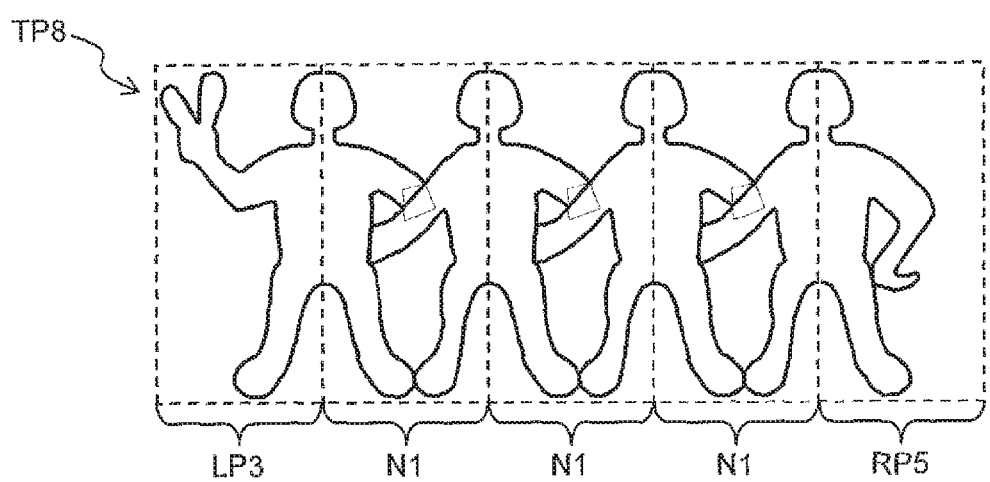
FIG. 13 is an explanatory view showing an example of a modified pictorial symbol with a wide pattern design, in a modification example capable of implementing production of a pictorial symbol with a wide pattern design.

FIG. 13 shows an example of a modified pictorial symbol with a wide pattern design in the form of a combination of a left-part pictorial symbol LP, one or more intermediate-part pictorial symbols, and a right-part pictorial symbol RP. The example of FIG. 13 shows a modified pictorial symbol TP8 with a wide pattern design in the form of a combination of the left-part pictorial symbol LP3, three intermediate-part pictorial symbols N1 in relation to a human pictorial symbol, and the right-part pictorial symbol RP5.

This modification example can also obtain similar effects to those of the above embodiment. According to this modification example, it is possible to implement print and display of a pictorial symbol with a wide pattern design and to reliably implement print and display of a wide variety of pictorial symbols.

(2) Others

Although the above embodiment combines two partial display dot pattern data unchangedly to display a special pictorial symbol and combines two partial print dot pattern data (left-part print dot pattern data and right-part print dot pattern data) unchangedly to generate print data containing a special pictorial symbol or it combines two partial print dot pattern data (lower-part print dot pattern data and upper-part print dot pattern data) in a rotation-processed manner to generate print data containing a special pictorial symbol, this is not limitative. More specifically, two partial display dot pattern data may be combined in such a manner that at least one of them is subjected to a rotation process and/or a reverse process, to display a special pictorial symbol, or two partial print dot pattern data may be combined in such a manner that at least one of them is subjected to a rotation process and/or a reversal process, to generate print data containing a special pictorial symbol. In this case, it is sufficient for two partial pictorial symbols having the same pattern design after rotation or reverse to prepare single partial print dot pattern data or single partial display dot pattern data. Thus, the data amount of the print dot pattern data and display dot pattern data to be prepared can further reliably be reduced.

Although partial print dot pattern data and partial display dot pattern data divided into two in left-to-right direction or in top-to-bottom direction are used in the above embodiment, partial print dot pattern data and partial display dot pattern data divided into four in top-to-bottom and left-to-right directions for example may be used. This case can also obtain similar effects.

Although the above description is given of the case where the present disclosure is applied to a printer that performs desired printing on a print-receiving tape to thereby produce a print label, this is not limitative. For example, the present disclosure may be applied to a printer that forms an image or prints a character on ordinary print-receiving paper of A4, A3, B4, B5 sizes, etc., or to a handheld printer driven by a battery power. This case can also obtain similar effects.

In the case that terms "vertical", "parallel", "plane", etc., are used in the above description, those terms represent by no means strict meaning. That is, those terms "vertical", "parallel", "plane" permit designing or manufacturing tolerances and errors, and mean "substantially vertical", "substantially parallel", "substantially plane", etc.

In the case that terms "same", "equal", "different", etc., are used about external dimensions and sizes in the above description, those terms represent by no means strict meaning. That is, those terms "same", "equal", "different", etc., permit designing or manufacturing tolerances and errors and mean "substantially same", "substantially equal", "substantially different", etc. It is however to be noted that if there is a description of a value as a predetermined judgment criterion or of a value as a boundary, such as a threshold value or a reference value, the terms "same", "equal", "different", etc., used therewith represent the strict meaning, unlike the above.

In the above, arrows shown in FIG. 4 indicate an example of the signal flow, and are not intended to limit the direction of the signal flow.

The flowchart shown in FIG. 12 is not intended to limit the present disclosure to the shown procedure, but addition or deletion of steps, change of the order, etc., may be made without departing from the spirit and technical idea of the present disclosure.

Other than the above, techniques of the above embodiment and the modification examples may appropriately be combined together in use.

What is claimed is:

1. A printer comprising:
a feeder configured to feed a print-receiving medium;
a printing head configured to form a print on said print-receiving medium fed by said feeder;
an operation device configured to input a desired operation;
a first memory configured to store a plurality of types of partial print data prepared in advance for print formation of a plurality of types of partial pictorial symbols wherein some of said partial pictorial symbols are combined into at least one pictorial symbol that is to be printed on said print-receiving medium, wherein said partial pictorial symbols includes at least one left partial pictorial symbol and at least one right partial pictorial symbol, wherein the at least one left partial pictorial symbol and the at least one right partial pictorial symbol are combined into the at least one pictorial symbol;
a processor;
a program memory; and
a matching information storing part;
wherein at least one left partial character code is assigned to said left partial pictorial symbol and at least one right partial character code is assigned to said right partial pictorial symbol,
wherein said matching information storing part is configured to store matching information about the one left partial pictorial symbol and the one right partial pictorial symbol,
wherein the left partial character code and the right partial character code differ from each other,
wherein said first memory is configured to store a left partial print data corresponding to said left partial pictorial symbol and a right partial print data corresponding to said right partial pictorial symbol;
wherein said program memory stores computer-executable instructions that, when executed by said processor, cause the printer to perform:
a determining operation acceptance process for accepting a determining operation for determining the at least one pictorial symbol via said operation device;
a print data generation process for generating print data including said pictorial symbol determined by variably combining, in accordance with said determining operation accepted in said determining operation acceptance process, said left partial print data corresponding to said left partial pictorial symbol and said right partial print data corresponding to said right partial pictorial symbol by using the left partial character code and the right partial character code related to the determined pictorial symbol while referring to said matching information storing part, the left partial print data and the right partial print data being stored in said first memory; and
a coordination control process for coordinately controlling said feeder and said printing head for forming a print corresponding to said print data on said print-receiving medium.

2. The printer according to claim 1, wherein
in said coordination control process, said feeder and said printing head are coordinately controlled so as to produce a print label by using said print-receiving medium on which the print corresponding to said print data is formed.

3. The printer according to claim 1, further comprising:
a display device configured to display a text including at least one character and said at least one pictorial symbol; and
a second memory configured to store at least one left partial display data prepared in advance for displaying said at last one left partial pictorial symbol and at least one right partial display data prepared in advance for displaying said at least one right partial pictorial symbol by using the corresponding at least one left partial character code and the corresponding at last one right partial character code,
wherein said program memory stores the computer-executable instructions that, when executed by said processor, cause the printer to further perform a first display control process for combining said left partial display data and said right partial display data that are stored in said second memory, to allow said pictorial symbol to be displayed on an editing screen of said display device by using the corresponding left partial character code and the corresponding right partial character code while referring to said matching information storing part,
in said determining operation acceptance process, said determining operation for determining the one pictorial symbol displayed on said editing screen as the one pictorial symbol to be printed on said print-receiving medium, is accepted.

4. The printer according to claim 3, wherein
the at least one left partial pictorial symbol includes a plurality of left partial pictorial symbols,
the at least one right partial pictorial symbol includes a plurality of right partial pictorial symbols,
said first memory is configured to not only store a plurality of types of left partial print data in such a manner that proper left partial character codes are assigned respectively to each of the left partial pictorial symbols, but also store a plurality of types of right partial print data in such a manner that proper right partial character codes are assigned respectively to each of the right partial pictorial symbols,
said second memory is configured to not only store a plurality of types of left partial display data in such a manner that said left partial character codes are assigned respectively to each of the left partial pictorial symbols, but also store a plurality of types of right partial display data in such a manner that said right partial character codes are assigned respectively to each of the right partial pictorial symbols.

5. The printer according to claim 3, wherein
the at least one left partial pictorial symbol includes a plurality of left partial pictorial symbols,
the at least one right partial pictorial symbol includes a plurality of right partial pictorial symbols,
the at least one left partial character code includes a plurality of left partial character codes, the at least one right partial character code includes a plurality of right partial character codes, said matching information storing part is configured to store said matching information about said plurality of left partial pictorial symbols and said plurality of right partial pictorial symbols that are combinable by using a relationship between the respective left partial character code corresponding to each of the left partial pictorial symbols and the respective right partial character code corresponding to each of the right partial pictorial symbols.

6. The printer according to claim 5, further comprising a basic pictorial symbol information storing part, wherein the plurality of pictorial symbols include a first pictorial symbol, the plurality of pictorial symbols include a plurality of basic pictorial symbols comprising a first basic pictorial symbol, said first basic pictorial symbol is equal to said pictorial symbols, said partial pictorial symbols includes at least one left first partial pictorial symbol and at least one right first partial pictorial symbol, wherein the one left first partial pictorial symbol and the one right first partial pictorial symbol are combined into the first basic pictorial symbol, a left first character code is assigned to said left first partial pictorial symbol, a right first character code is assigned to said right first partial pictorial symbol, said basic pictorial symbol information storing part is configured to store the one left partial character code and the one right partial character code as a pair of character codes per the each basic pictorial symbol wherein the one left partial character code and the one right partial character code consists the one basic pictorial symbol as well as store said left first character code assigned to said left first partial pictorial symbol and said right first character code assigned to said right first partial pictorial symbol in a manner corresponding to said first basic pictorial symbol, the left first partial pictorial symbol and the right first partial pictorial symbol forming the first basic pictorial symbol, said matching information storing part is configured to store said plurality of left partial pictorial symbols and said plurality of right partial pictorial symbols that are related to said first basic pictorial symbol and are combinable, in said first display control process, said first basic pictorial symbol is displayed on said editing screen by combining the left first partial display data and the right first partial display data that are in relation to said first basic pictorial symbol stored in said second memory while referring to said basic pictorial symbol information storing part, the left first partial display data corresponding to said left first character code, the right first partial display data corresponding to said right first character code of said right first partial pictorial symbol, said program memory stores the computer-executable instructions that, when executed by said processor, cause the printer to further perform:

a first selecting operation acceptance process for accepting a first selecting operation via said operation device for selecting said first basic pictorial symbol of said plurality of pictorial symbols displayed on said editing screen;

an extraction process for referring to said matching information stored in said matching information storing part so as to extract a plurality of said left partial display data in relation to a plurality of said left partial pictorial symbols respectively combinable with said right first partial pictorial symbol of said first basic pictorial symbol as said selected first pictorial symbol, from said second memory, or to extract a plurality of said right partial display data in relation to a plurality of said right partial pictorial symbols respectively combinable with said left first partial pictorial symbol of said first basic pictorial symbol as said selected first pictorial symbol, from said second memory;

a second display control process for using said plurality of right partial display data or said plurality of left partial display data that is extracted in said extraction process, to allow the corresponding plurality of right partial pictorial symbols or the corresponding plurality of left partial pictorial symbols to be displayed on a selection screen of said display device; and a second selecting operation acceptance process for accepting a second selecting operation via said operation device for selecting one or more among said plurality of left partial pictorial symbols or said plurality of right partial pictorial symbols that are displayed on said selection screen, wherein in said first display control process, said left first partial display data in relation to said first basic pictorial symbol selected by said first selecting operation is replaced by or combined with said left partial display data corresponding to said left partial pictorial symbol selected by said second selecting operation or said right first partial display data in relation to said first basic pictorial symbol selected by said first selecting operation is replaced by or combined with said right partial display data corresponding to said right partial pictorial symbol selected by said second selecting operation so as to allow a second pictorial symbol with a different pattern design from that of said first pictorial symbol to be displayed on said editing screen in place of said first pictorial symbol.

7. The printer according to claim 6, wherein said program memory stores the computer-executable instructions that, when executed by said processor, cause the printer to further perform:

a third selecting operation acceptance process for accepting a third selecting operation via said operation device for selecting one of said at least one first pictorial symbols displayed on said editing screen; and an exclusion process for prohibiting said one first pictorial symbol selected by said third selecting operation accepted in said third selecting operation acceptance process from being selected by said first selecting operation.

8. The printer according to claim 7, further comprising a third memory configured to store a plurality of types of different-mode display data prepared in advance for display of said at least one first pictorial symbol in a mode different from a display mode by a combination of said plurality of types of said partial display data in relation to said first pictorial symbols, wherein said basic pictorial symbol information storing part is configured to further store at least one different-mode character code of said different-mode display data, said at least one different-mode character code is stored in a manner that the different-mode character code is linked to said left first character code and said right first character code that respectively correspond to said left first partial pictorial symbol and said right first partial pictorial symbol wherein said left first partial pictorial symbol and said right first partial pictorial symbol are combined into the one first pictorial symbol, in said first display control process, display of said first pictorial symbol that is not to be selected by said first selecting operation by said exclusion process on said editing screen is changed from display in the form of said combination of said left partial display data and said right partial display data in relation to the one first pictorial symbol stored in said second memory into display by use of one of said different-mode display data in relation to the one first pictorial symbol, by means of replacing said left first character code and said right first character code that are stored in said third memory respectively corresponding to said left first partial pictorial symbol and said right first partial pictorial symbol wherein said left first partial pictorial symbol and said right first partial pictorial symbol are combined into the one first pictorial symbol with said different-mode display data linked to said left first character code and said right first character code.

9. The printer according to claim 1, wherein
in said print data generation process, said left partial print data and said right partial print data are combined unchangedly without exception or said left partial print data and said right partial print data are combined in such a manner that one or more of them are subjected to at least one of a rotation process and a reverse process, thereby said print data including the determined pictorial symbol is generated.

10. The printer according to claim 1, wherein
said first memory is configured to store said plurality of types of partial print data including one of said left partial print data in relation to one of said left partial pictorial symbol one of said right partial print data in relation to one of said right partial pictorial symbol, and at least one intermediate partial print data in relation to at least one intermediate partial pictorial symbol capable of being disposed between said left partial pictorial symbol and said right partial pictorial symbol,
in said print data generation process, said one left partial print data and said one right partial print data are variably combined, or said one left partial print data, said one right partial print data, and one or more said intermediate partial print data are variably combined, thereby said print data including the determined pictorial symbol is generated.

11. The printer according to claim 3, wherein
data size of print dot pattern data of a single said character has a range of p vertical dots×q horizontal dots,
a data size of print data pattern data of each of said partial print data has the range of p vertical dots×q horizontal dots,
a data size of print data pattern data of said one pictorial symbol that is formed by combining the one left partial pictorial symbol and the one right partial pictorial symbol has a range of p vertical dots×2q horizontal dots.

12. The printer according to claim 3, wherein
a data size of display dot pattern data of a single said character has a range of m vertical dots×n horizontal dots, a data size of display data pattern data of each of said left partial display data and aid right partial display data has the range of m vertical dots×n horizontal dots,
a data size of display data pattern data of said one pictorial symbol that is formed by combining the one left partial pictorial symbol and the one right partial pictorial symbol has a range of m vertical dots×2n horizontal dots.

13. The printer according to claim 12, wherein
in said first display control process, a length of an under cursor displayed below a specific said pictorial symbol that is displayed in the form of a combination of said plurality of types of said partial display data, is set to be double the length of that of an under cursor displayed below said single character, on said editing screen.

14. The printer according to claim 6, further comprising a fourth memory configured to store character codes, wherein
in said first display control process, said left first character code and said right first character code in relation to said first pictorial symbol is stored into said fourth memory when said one first pictorial symbol is displayed on said editing screen,
when said second pictorial symbol is displayed in place of said one first pictorial symbol on said editing screen, said left first character code and said right first character code stored in said fourth memory are respectively replaced with said left partial character code and said right partial character code in relation to said one second pictorial symbol, and
in said coordination control process,
said feeder and said printing head are coordinately controlled so as to form a print based on the replaced character code.

15. The printer according to claim 8, wherein
a data size of display dot pattern data of said one different-mode display data is equal to a data size of display dot pattern data of a single said character,
a data size of display dot pattern data of said single said character has a range of m vertical dots×n horizontal dots,
a data size of display data pattern data of said one different-mode display data has the range of m vertical dots×n horizontal dots,
a data size of display data pattern data of said one pictorial symbol that is formed by combining the one left partial pictorial symbol and the one right partial pictorial symbol has a range of m vertical dots×2n horizontal dots.

16. The printer according to claim 15, wherein
in said first display control process, a length of an under cursor displayed below said one first pictorial symbol by use of said one different-mode display data is set to be equal to that of an under cursor displayed below said single character, on said editing screen.

* * * * *